(12) United States Patent
Nicodemus et al.

(10) Patent No.: US 7,395,341 B2
(45) Date of Patent: Jul. 1, 2008

(54) SYSTEM, METHOD, APPARATUS AND COMPUTER PROGRAM PRODUCT FOR FACILITATING DIGITAL COMMUNICATIONS

(75) Inventors: Blair Gaver Nicodemus, North Wales, PA (US); Derek Bluestone, Collegeville, PA (US); Clinton Adams, Collegeville, PA (US); Joseph E. Pappano, Westchester, PA (US); Howard M. Pressman, Chalfont, PA (US)

(73) Assignee: Fiberlink Communications Corporation, Blue Bell, PA (US)

( * ) Notice: Subject to any disclaimer, the term of this patent is extended or adjusted under 35 U.S.C. 154(b) by 883 days.

(21) Appl. No.: 10/918,362

(22) Filed: Aug. 16, 2004

(65) Prior Publication Data

US 2005/0086510 A1    Apr. 21, 2005

Related U.S. Application Data

(60) Provisional application No. 60/581,729, filed on Jun. 23, 2004, provisional application No. 60/495,131, filed on Aug. 15, 2003.

(51) Int. Cl.
*G06F 15/16* (2006.01)
(52) U.S. Cl. .................. 709/229; 709/219; 709/227; 709/228
(58) Field of Classification Search .................. None
See application file for complete search history.

(56) References Cited

U.S. PATENT DOCUMENTS

| 5,666,411 | A | 9/1997 | McCarty |
| 5,673,322 | A | 9/1997 | Pepe et al. |
| 5,721,779 | A | 2/1998 | Funk |
| 5,732,074 | A | 3/1998 | Spaur et al. |
| 5,901,284 | A | 5/1999 | Hamdy-Swink |
| 5,987,611 | A * | 11/1999 | Freund .......................... 726/4 |
| 6,012,100 | A | 1/2000 | Frailong et al. |
| 6,061,650 | A | 5/2000 | Malkin et al. |
| 6,081,508 | A | 6/2000 | West et al. |
| 6,151,628 | A | 11/2000 | Xu et al. |
| 6,185,609 | B1 | 2/2001 | Rangarajan et al. |
| 6,253,327 | B1 | 6/2001 | Zhang et al. |
| 6,377,982 | B1 | 4/2002 | Rai et al. |
| 6,453,035 | B1 | 9/2002 | Psarras et al. |
| 6,493,349 | B1 | 12/2002 | Casey |
| 6,507,908 | B1 * | 1/2003 | Caronni ....................... 713/153 |
| 6,539,482 | B1 | 3/2003 | Blanco et al. |

(Continued)

OTHER PUBLICATIONS

"Virtual Private Networking in Wlndows 2000: An Overview", Microsoft Windows 2000 Server (1999) 28 pages.

(Continued)

*Primary Examiner*—John B. Walsh
(74) *Attorney, Agent, or Firm*—Powell Goldstein LLP

(57) ABSTRACT

A computer-implemented method and apparatus prevents unsecured access to a computer over a network by a client running on a remote computer. In one aspect of the present invention, a client policy is stored on the remote computer. The client policy includes a configuration of the remote computer that reduces the likelihood of a security breach of the computer as a result of the remote computer accessing the computer. A request is received from a user for access to the computer. It is verified that the remote computer conforms with the client policy, and the client is connected to said computer.

16 Claims, 22 Drawing Sheets

U.S. PATENT DOCUMENTS

| | | |
|---|---|---|
| 6,643,782 B1 | 11/2003 | Jin et al. |
| 6,654,891 B1 | 11/2003 | Borsato et al. |
| 6,694,437 B1 | 2/2004 | Pao et al. |
| 6,732,270 B1 | 5/2004 | Patzer et al. |
| 6,748,543 B1 | 6/2004 | Vilhuber |
| 6,751,729 B1 | 6/2004 | Giniger et al. |
| 6,760,444 B1 | 7/2004 | Leung |
| 6,766,453 B1 | 7/2004 | Nessett et al. |
| 6,778,498 B2 | 8/2004 | McDysan |
| 6,785,823 B1 | 8/2004 | Abrol et al. |
| 6,850,943 B2 * | 2/2005 | Teixeira et al. ............... 707/10 |
| 6,874,139 B2 | 3/2005 | Krueger et al. |
| 7,111,324 B2 | 9/2006 | Elteto et al. |
| 7,240,015 B1 * | 7/2007 | Karmouch et al. ............ 705/4 |
| 7,340,770 B2 * | 3/2008 | Freund ....................... 726/11 |
| 2002/0138756 A1 | 9/2002 | Makofka et al. |
| 2002/0199203 A1 | 12/2002 | Duffy et al. |
| 2003/0074580 A1 | 4/2003 | Knouse et al. |
| 2003/0105978 A1 | 6/2003 | Byrne |
| 2003/0135611 A1 | 7/2003 | Kemp et al. |
| 2004/0005886 A1 | 1/2004 | Oda et al. |
| 2004/0088565 A1 | 5/2004 | Norman et al. |
| 2004/0107360 A1 | 6/2004 | Herrmann et al. |
| 2004/0123162 A1 | 6/2004 | Antell et al. |
| 2004/0193907 A1 | 9/2004 | Patanella |
| 2004/0221174 A1 | 11/2004 | Le Saint et al. |
| 2005/0015622 A1 | 1/2005 | Williams et al. |
| 2005/0033596 A1 | 2/2005 | Tummolo |
| 2005/0044418 A1 | 2/2005 | Miliefsky |
| 2005/0060537 A1 | 3/2005 | Stamos et al. |
| 2005/0132225 A1 | 6/2005 | Gearhart |
| 2005/0138408 A1 | 6/2005 | Vanover et al. |
| 2005/0144475 A1 | 6/2005 | Sakaki et al. |
| 2005/0154885 A1 | 7/2005 | Viscomi et al. |
| 2005/0166065 A1 | 7/2005 | Eytchison et al. |
| 2005/0172142 A1 | 8/2005 | Shelest et al. |
| 2005/0188065 A1 | 8/2005 | O'Rourke et al. |

OTHER PUBLICATIONS

Davies, Joseph "Radius Protocol Security and Best Practices", Microsoft Windows 2000 Server (Jan. 2002) 16 pages.

* cited by examiner

| DECIMAL | ASCII CHARACTER | SUPPORTED IN CLIENT USER ID OR PASSWORD ? | ENCRYPTION/DECRYPTION CHARACTER SUBSTITUTION |
|---|---|---|---|
| 0 | NULL | NO | NOT SUPPORTED |
| 1 | SOH | NO | NOT SUPPORTED |
| 2 | STX | NO | NOT SUPPORTED |
| 3 | ETX | NO | NOT SUPPORTED |
| 4 | EOT | NO | NOT SUPPORTED |
| 5 | ENQ | NO | NOT SUPPORTED |
| 6 | ACK | NO | NOT SUPPORTED |
| 7 | BEL | NO | NOT SUPPORTED |
| 8 | BS | NO | NOT SUPPORTED |
| 9 | TAB | NO | NOT SUPPORTED |
| 10 | LF | NO | NOT SUPPORTED |
| 11 | V.T. | NO | NOT SUPPORTED |
| 12 | FF | NO | NOT SUPPORTED |
| 13 | C.R | NO | NOT SUPPORTED |
| 14 | SOH | NO | NOT SUPPORTED |
| 15 | SI | NO | NOT SUPPORTED |
| 16 | DLE | NO | NOT SUPPORTED |
| 17 | DC1 | NO | NOT SUPPORTED |
| 18 | DC2 | NO | NOT SUPPORTED |
| 19 | DC3 | NO | NOT SUPPORTED |
| 20 | DC4 | NO | NOT SUPPORTED |
| 21 | NAK | NO | NOT SUPPORTED |
| 22 | SYN | NO | NOT SUPPORTED |
| 23 | ETB | NO | NOT SUPPORTED |
| 24 | CAN | NO | NOT SUPPORTED |
| 25 | EM | NO | NOT SUPPORTED |
| 26 | SUB | NO | NOT SUPPORTED |
| 27 | ESC | NO | NOT SUPPORTED |
| 28 | FS | NO | NOT SUPPORTED |
| 29 | G.S | NO | NOT SUPPORTED |
| 30 | R.S | NO | NOT SUPPORTED |
| 31 | U.S | NO | NOT SUPPORTED |
| 32 | SPACE | YES | -a |
| 33 | ! | YES | -b |
| 34 | " | NO | NOT SUPPORTED |
| 35 | # | YES | -c |
| 36 | $ | YES | -d |
| 37 | % | YES | -e |
| 38 | & | YES | -f |
| 39 | ' | NO | NOT SUPPORTED |
| 40 | ( | YES | -g |

*FIG. 19A*

| | | | |
|---|---|---|---|
| 41 | ) | YES | -h |
| 42 | * | YES | -i |
| 43 | + | YES | -j |
| 44 | , | NO | NOT SUPPORTED |
| 45 | - | YES | -k |
| 46 | . | YES | -l |
| 47 | / | NO | NOT SUPPORTED |
| 48 | 0 | YES | 0 |
| 49 | 1 | YES | 1 |
| 50 | 2 | YES | 2 |
| 51 | 3 | YES | 3 |
| 52 | 4 | YES | 4 |
| 53 | 5 | YES | 5 |
| 54 | 6 | YES | 6 |
| 55 | 7 | YES | 7 |
| 56 | 8 | YES | 8 |
| 57 | 9 | YES | 9 |
| 58 | : | YES | -m |
| 59 | ; | YES | -n |
| 60 | < | YES | -o |
| 61 | = | YES | -p |
| 62 | > | YES | -q |
| 63 | ? | YES | -r |
| 64 | @ | NO | NOT SUPPORTED |
| 65 | A | YES | A |
| 66 | B | YES | B |
| 67 | C | YES | C |
| 68 | D | YES | D |
| 69 | E | YES | E |
| 70 | F | YES | F |
| 71 | G | YES | G |
| 72 | H | YES | H |
| 73 | I | YES | I |
| 74 | J | YES | J |
| 75 | K | YES | K |
| 76 | L | YES | L |
| 77 | M | YES | M |
| 78 | N | YES | N |
| 79 | O | YES | O |
| 80 | P | YES | P |
| 81 | Q | YES | Q |
| 82 | R | YES | R |
| 83 | S | YES | S |
| 84 | T | YES | T |

*FIG. 19B*

| | | | |
|---|---|---|---|
| 85 | U | YES | U |
| 86 | V | YES | V |
| 87 | W | YES | W |
| 88 | X | YES | X |
| 89 | Y | YES | Y |
| 90 | Z | YES | Z |
| 91 | [ | YES | -s |
| 92 | \ | YES | -t |
| 93 | ] | YES | -u |
| 94 | ^ | NO | -v |
| 95 | _ | YES | -w |
| 96 | . | YES | -x |
| 97 | a | YES | a |
| 98 | b | YES | b |
| 99 | c | YES | c |
| 100 | d | YES | d |
| 101 | e | YES | e |
| 102 | f | YES | f |
| 103 | g | YES | g |
| 104 | h | YES | h |
| 105 | i | YES | i |
| 106 | j | YES | j |
| 107 | k | YES | k |
| 108 | l | YES | l |
| 109 | m | YES | m |
| 110 | n | YES | n |
| 111 | o | YES | o |
| 112 | p | YES | p |
| 113 | q | YES | q |
| 114 | r | YES | r |
| 115 | s | YES | s |
| 116 | t | YES | t |
| 117 | u | YES | u |
| 118 | v | YES | v |
| 119 | w | YES | w |
| 120 | x | YES | x |
| 121 | y | YES | y |
| 122 | z | YES | z |
| 123 | { | YES | -y |
| 124 | \| | YES | -z |
| 125 | } | YES | -1 |
| 126 | ~ | YES | -2 |
| 127 | DEL | NO | NOT SUPPORTED |
| 127-255 | VARIOUS | NO | NOT SUPPORTED |

*FIG. 19C*

SYSTEM, METHOD, APPARATUS AND COMPUTER PROGRAM PRODUCT FOR FACILITATING DIGITAL COMMUNICATIONS

CROSS REFERENCE TO RELATED APPLICATIONS

This application claims the benefit of the earlier filing date of U.S. Provisional Application No. 60/495,131, filed Aug. 15, 2003, entitled "System, Method, Apparatus and Computer Program Product for Facilitating Digital Communications" and U.S. Provisional Application No. 60/581,729, filed Jun. 23, 2004, entitled "System, Method, Apparatus and Computer Program Product for Facilitating Digital Communications," the entirety of both of which being incorporated herein by reference.

FIELD OF THE INVENTION

The present invention generally relates to systems and methods for providing secure digital communications over a computer network.

BACKGROUND OF THE INVENTION

A Virtual Private Network (VPN) is a private network created over a public network where exclusive client and host communications occur. A conventional VPN connects users or sites over a public network, usually the Internet. Virtual privacy is derived from secure tunnels that encapsulate the data as it moves across the shared lines. The VPN enables a user to securely send data between two computers across a shared, public network in a manner that emulates the security properties of a private point-to-point link.

However, the conventional protocol for a remote access (RA) client (a client for creating an Internet connection) communicates the login credentials of the users in an unsecured fashion. If a user maintains identical login credentials for RA authentication and VPN authentication, then the VPN is compromised if the user's RA credentials are stolen. Accordingly, a VPN using a conventional VPN client is vulnerable to the extent the user's RA credentials are vulnerable.

FIGS. 1 and 2 illustrate the conventional RA authentication methods and security levels. RA client 10 running on computer 11 accesses server 90 over Internet 40. For example, a typical Internet dial-up connection uses either Password Authentication Protocol (PAP) or Challenge-Handshake Authentication Protocol (CHAP) over Point-to-Point Protocol (PPP) for transporting user credentials to the Internet service Provider's (ISP's) dial access server 30 or network access server (NAS) 42. Remote Authentication Dial-In User Service (RADIUS) is used to transport user credentials between the NAS, the ISP and server 90. PAP transmits user identification (ID) and password credentials in clear text between the personal computer 11 (PC) and the NAS. Between the NAS and the RADIUS server, the username is in the clear (i.e., not encrypted), followed by a hashed password using a shared secret setup between the NAS and the RADIUS server.

CHAP utilizes a three-way handshaking process. Once the link has been established, the server sends a challenge message to the originating device. The originating device responds back with a value that is calculated using the user password and a one-way hash function. The server checks the response against its own calculation of the expected hash value. If the values match, the authentication is accepted. CHAP transmits user ID in clear text, but a hash of the password. RADIUS transmits the user name in clear text followed by a hashed password using a shared secret setup between the NAS and the RADIUS server.

One or more ISPs may be involved in the authentication transaction, especially when cross-provider network roaming services are being used. In these situations, the RADIUS protocol is normally used for relaying authentication requests and responses between authentication entities. In these transactions, the user ID is normally transmitted in clear text, although the password is transmitted in encrypted form. However, the password is decrypted and re-encrypted at each ISP involved in the transaction.

Even when the user is accessing the Internet via a wireless networking (Wi-Fi) hotspot, roaming broadband or some other method, and the initial hop of the authentication process secures the user's ID and password via Secure Sockets Layer (SSL) encryption, the ID and password must still be decrypted by the local ISPs before being transmitted via RADIUS. Thus even in these situations, encrypted user ID and passwords are not necessarily protected from theft. In fact, the user ID and password are subject to theft whenever they are communicated in clear text, whether by unscrupulous ISP employees, or others who have hacked into the ISP network. These conventional RA authentication processes are shown in FIG. 3. Accordingly, RA credentials are vulnerable to compromise, potentially leading to theft of Internet access services, and compromise of a VPN accessed by credentials identical to the RA credentials.

Two security products created for authenticating connections to local area networks (LANs) are called ACESERVER and SECUREID (marketed by RSA Security, Inc. an industry leading authentication products supplier). These two products are a tightly coupled system. The SECUREID is a pseudo-random number generator, which outputs a new value every minute. When a SECUREID user is authenticating their login they input their user ID as usual. However instead of entering a reusable password, they enter a personal identification number (PIN) as well as the then-current random number displayed on the SECUREID device. The combination of a pseudo-random number and a PIN is often referred to as a passcode. The authentication request is transmitted over the network (or networks) and ultimately to the ACESERVER. The ACESERVER applies an algorithm to determine what the then-current random number should be for that user and then makes an authentication decision.

The ACESERVER supports a periodic administratively forced PIN reset functionality just as other authentication applications support administratively forced password reset functionality. This is called a "New PIN Challenge." When a PIN reset is required, instead of acknowledging the authentication request, the ACESERVER sends a "New PIN" challenge command to the user. The ACESERVER also supports a periodic random challenge to the user. This is called a "Next Token Challenge." This is done when an authentication failure occurs (e.g. the PIN or random numbers provided by the user do not match those calculated by the ACESERVER). When a new random number (the "token") is required, instead of acknowledging the authentication request, the ACESERVER sends a "Next Token" challenge command to the user.

Conventional dial-up Internet networks and networking protocols (e.g. PAP and CHAP) do not support the notion of sending challenges to the user. The user's computer initiates a connection request, the dial in server commands the user's computer to respond with a user ID and password via either the PAP or CHAP dial authentication protocols. The user's computer responds with the appropriate values and the dial in server transmits them to the ISP. The dial-in server then waits for either an authentication success or authentication failure response. No other response types are supported, including challenge commands originating from an RSA ACES-ERVER. If either of these message types were returned from the ACESERVER to the dial in server, authentication would fail, as they are unrecognized message types. The present inventors are unaware of systems using a challenge response system such as the ACESERVER and SECUREID for authenticating Internet access.

Further, a conventional VPN client application allows a remote user to establish a direct connection to a corporate network when not on the premises of the corporation. When connecting in this fashion, the connection bypasses the usual corporate network security measures (e.g. firewalls and anti-virus servers). By permitting remote users to bypass the network security perimeter, enterprises run a significant risk that a user establishing a VPN connection to the corporate network is doing so from an unsafe and/or already "infected" machine. This connectivity from an unsafe computer creates a risk that the computer could be used as source of an attack on the network without the end user being aware of it.

Accordingly, a secure means of remote access to a computer system is needed.

SUMMARY OF THE INVENTION

The present invention is generally directed to a method, apparatus, computer system, and software product for secure remote access of a computer.

In one embodiment, a method of the present invention includes encrypting credentials with an encryption algorithm, the credentials including a user identification and a password.

In another embodiment, an aspect of the present invention includes receiving encrypted credentials over an Internet data communication network, the credentials including an encrypted user identifier and an encrypted password, decrypting the credentials, and providing a client access to a computer if the decrypted credentials are valid.

In another embodiment, an aspect of the present invention includes transmitting a passcode rather than a password to an authentication server over an Internet data communication network.

In another embodiment, an aspect of the present invention includes transmitting an authentication challenge to a client, receiving a passcode, PIN, or pseudo-random number from the client over an Internet data communication network, and transmitting a verification message to the client if the provided value is verified by an authentication server.

In another embodiment, an aspect of the present invention includes verifying that a remote computer running the client conforms with a client policy before connecting the client to a computer.

In another embodiment, an aspect of the present invention includes determining a location type of a remote computer running the client, selecting a client policy and connection configuration based on the location type of the remote computer; and verifying that the remote computer conforms with the client policy before connecting the client to the computer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 is a table showing an exemplary mapping of some unsupported characters to supported characters.

DETAILED DESCRIPTION OF THE PREFERRED EMBODIMENTS

Figure 1:
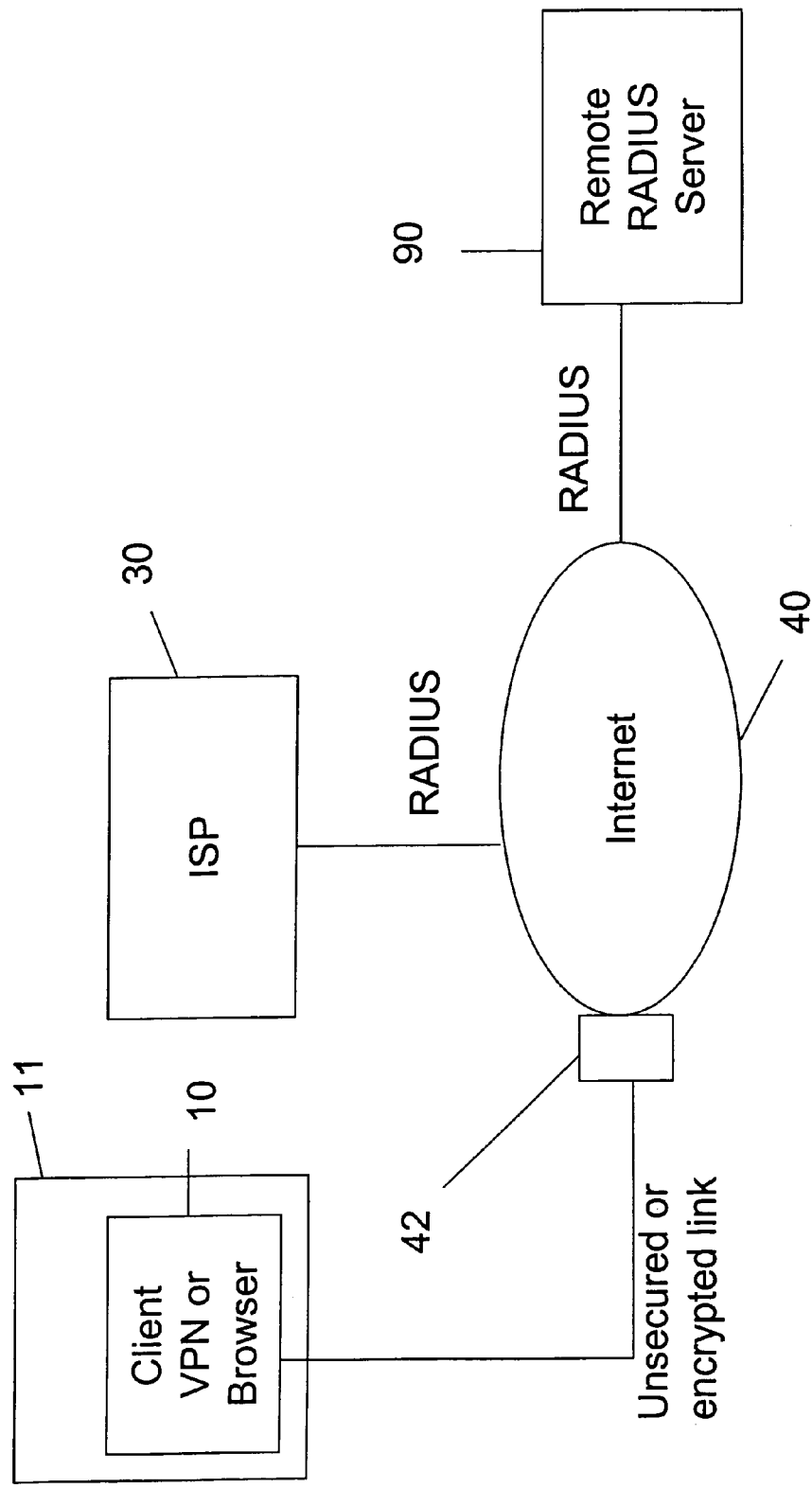
FIG. 1 is a block diagram of a conventional VPN system.
Figure 2:
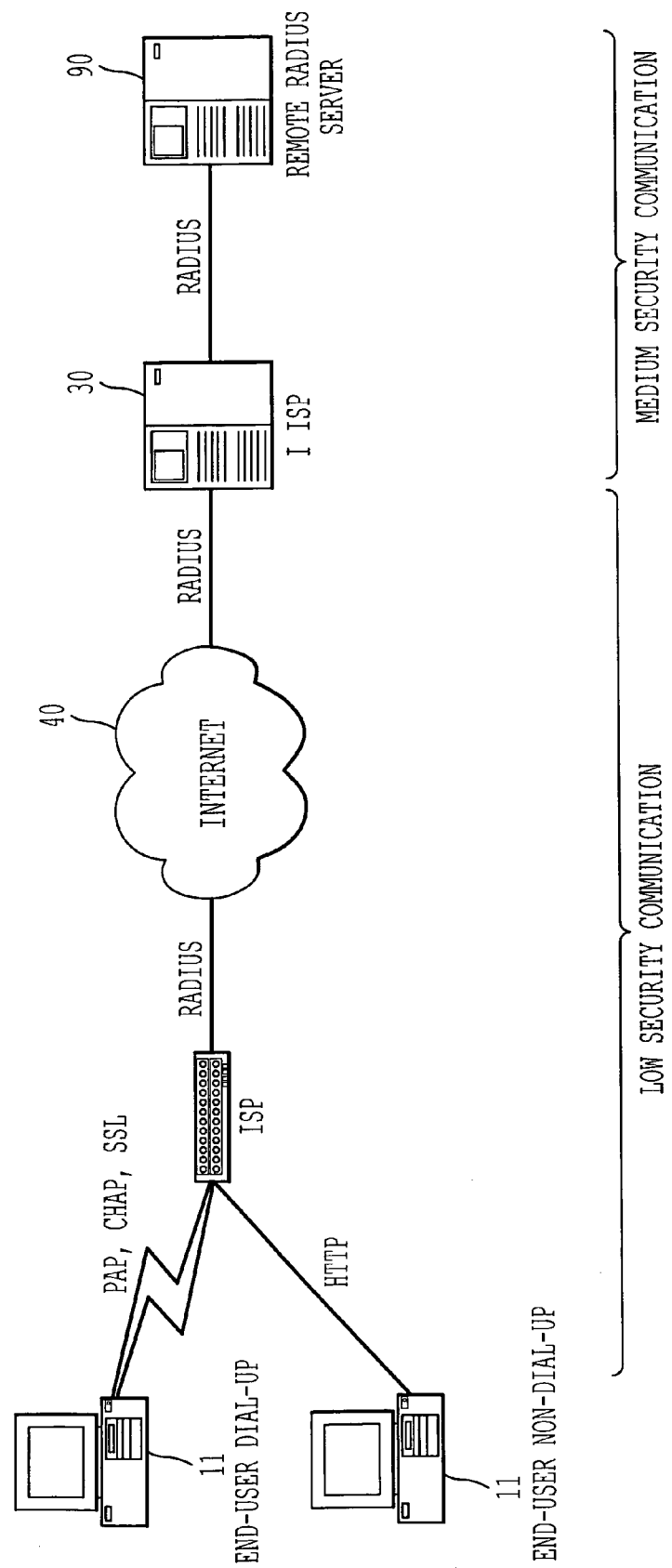
FIG. 2 is a schematic diagram of a conventional VPN system.
Figure 3:
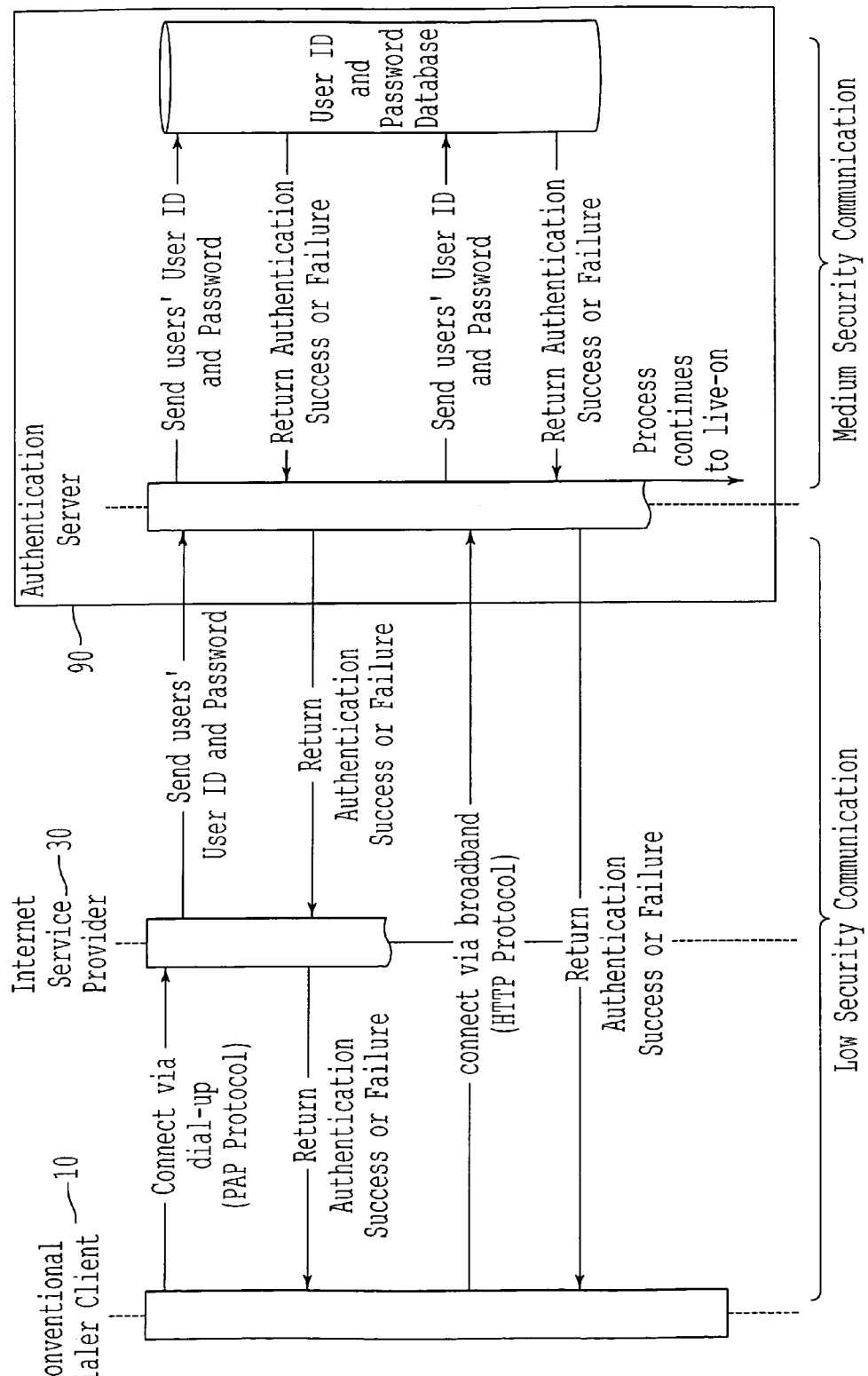
FIG. 3 is a schematic diagram of the authentication process of a conventional VPN system.

Referring now to the drawings, wherein like reference numerals designate identical or corresponding parts throughout the several views.

Figure 4:
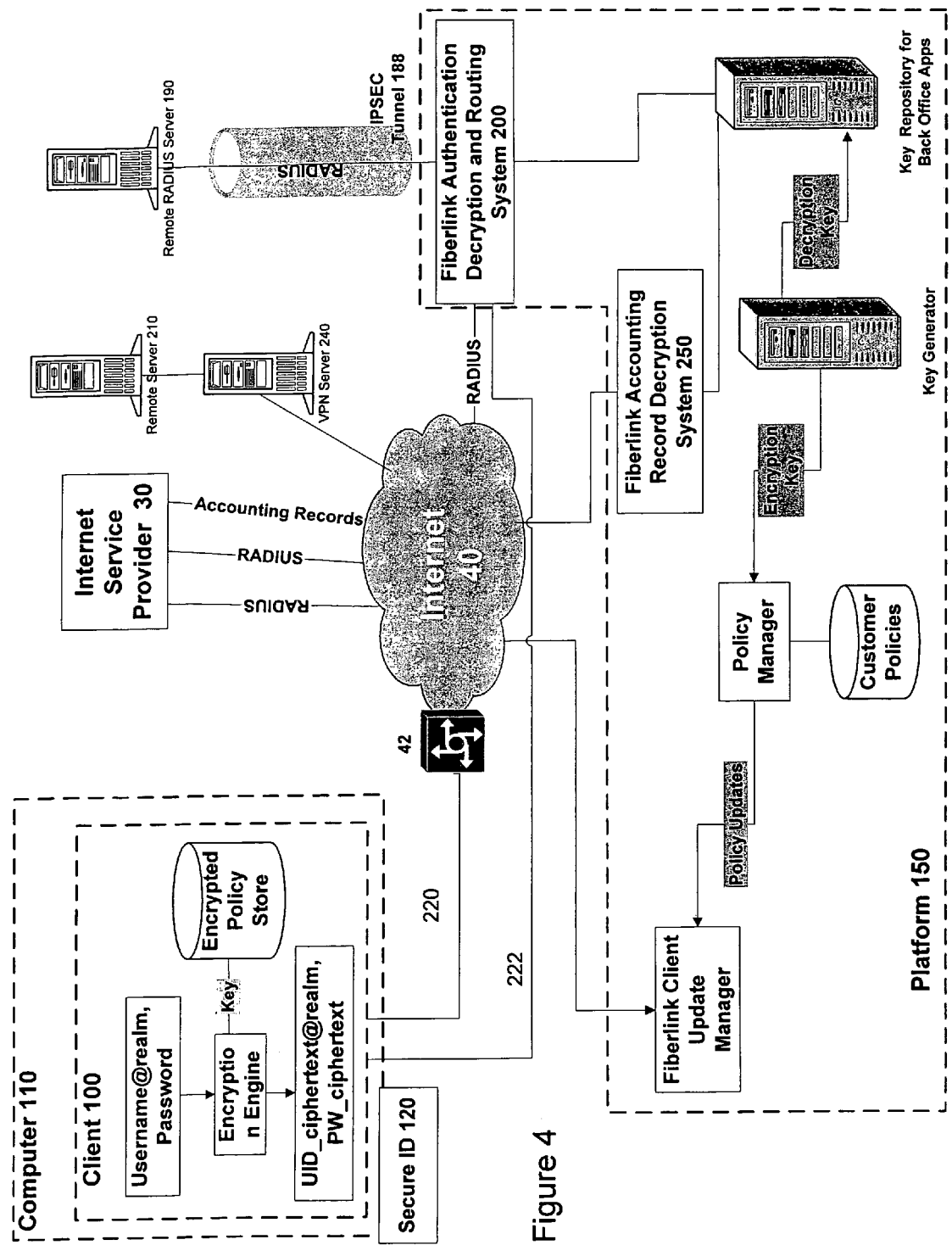
FIG. 4 is a block diagram of an embodiment of the present invention where the user ID and password are encrypted by the client and decrypted by the authentication server.

An exemplary embodiment of the present invention is illustrated in FIG. 4. FIG. 4 shows a computer system including a client 100 running on a computer 110 having a connection to the Internet 40 through NAS 42. Platform 150 is also connected to Internet 40. Remote RADIUS server 190 is connected to platform 150 through IPSec tunnel 188. Platform 150 includes Authentication, Decryption, and Routing System 200 and Single Sign On Application Server (SSOS) 160. Computer 110 has a SECUREID 120 associated therewith.

When a user requires access to remote server 210 from computer 110, the user enters their login credentials (user ID and password) into computer 110. Client 100 encrypts the user's ID and separately encrypts the user's password prior to passing the encrypted credentials to computer 110, which then transmits the credentials over the network without further modification. The encryption process utilizes a seed and an encryption key (shown in FIG. 7). The seed is a character string that is prepended, appended, or algorithmically mixed with the encrypted ID prior to transmission of the user credentials to the NAS 42. Once the encryption process is complete, the standard prefix(es) and/or suffix(es) required for proper routing of RADIUS authentication requests are appended prior to the client 100 passing the NAI to computer 110. Once the NAI is constructed, the NAI and the password are passed to computer 110. Routing-related information (e.g. roaming_partner/and/or @domainname.com) identifying platform 150 as the destination must be transmitted in clear text so that ISP 30 is able to identify the routing request as originating from a user associated with platform 150 and subsequently route the authentication request to platform 150 for processing. The roaming_partner/user ID @domainname.com character string may take many forms and is known in the art as a Network Access Identifier (NAI). The authentication request containing the encrypted user ID, seed, routing information, and encrypted password is then sent from computer 110 to NAS 42.

Figure 5:
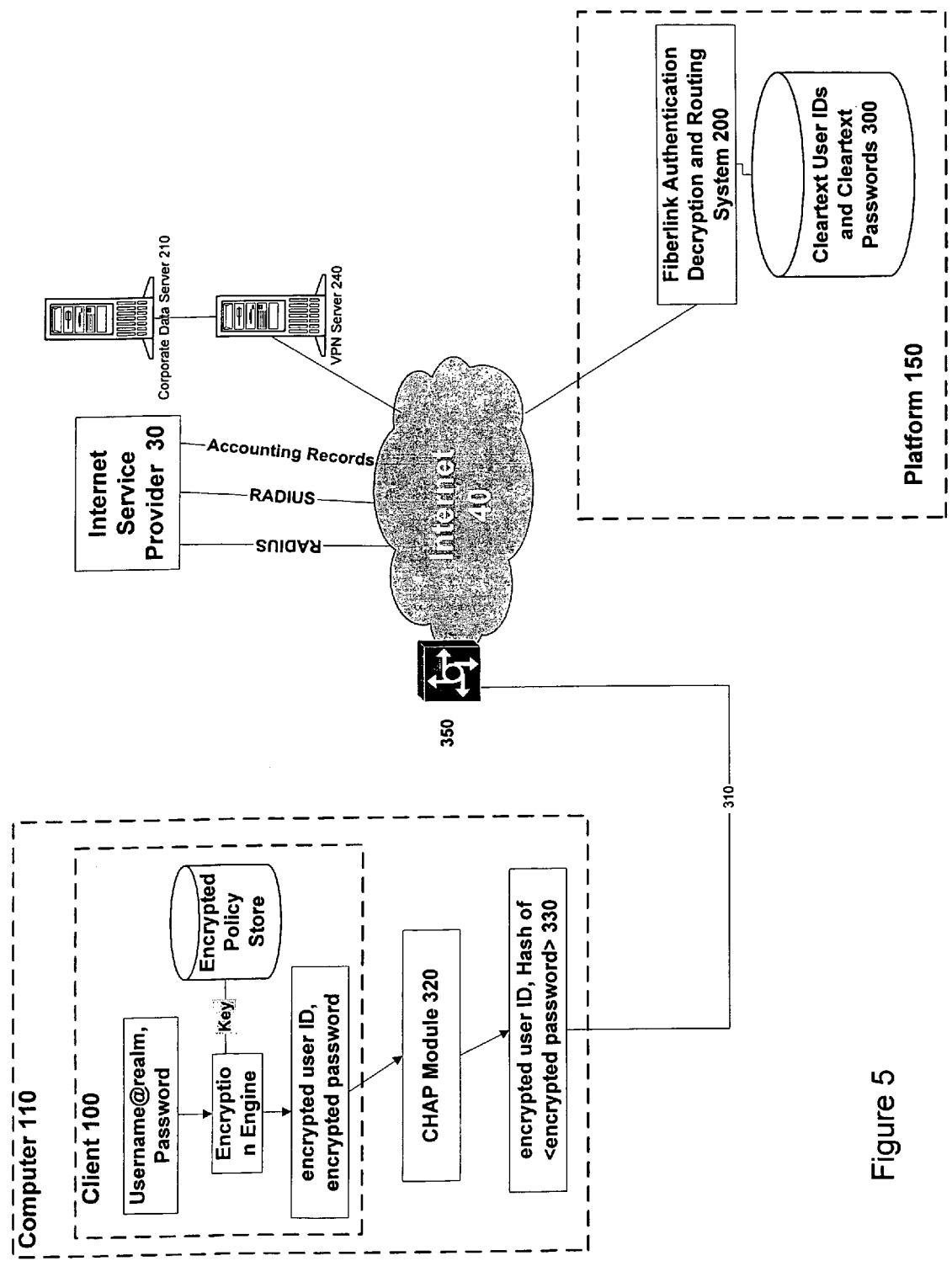
FIG. 5 is a block diagram of an embodiment of the present invention where the user ID and password are encrypted by the client and decrypted by the authentication server, and the authentication protocol being used by computer 110 and the NAS is CHAP.

In the case where the authentication protocol being used by computer 110 and NAS 42 is PAP or SSL, no further modifications to the credentials created by client 100 occur before computer 110 transmits the credentials over the secure or unencrypted communications link 220 to NAS 42. However, in an embodiment where the authentication protocol being used by computer 110 and the NAS is CHAP (shown in FIG. 5), CHAP NAS 350 generates a random number (called a "challenge") and transmits the challenge to computer 110. Before computer 110 transmits the credentials provided to it by client 100 over communications link 310 to NAS 350 using CHAP, computer 110 algorithmically mixes the encrypted password provided by client 100 and the challenge provided by CHAP NAS 350 using a one-way hashing function such as MD-5. Other hashing functions can be used and are within the scope of the invention. Computer 110 transmits the NAI as passed to it by the client and the hashed encrypted password to CHAP NAS 350 over communications link 310.

In the case where PAP or SSL is used by NAS 42 to receive the user's credentials, NAS 42 creates a RADIUS authentication request containing a user ID attribute and a password attribute. The user ID attribute will contain the key ID, character mapping ID, encryption algorithm ID, seed, routing information and the encrypted user ID. The password attribute will contain the encrypted password. In the case where CHAP is used by CHAP NAS 350 to receive the user's credentials, CHAP NAS 350 creates a RADIUS authentication request containing a user ID attribute, a password attribute, and a CHAP challenge attribute. The CHAP challenge attribute contains the same random number that was sent from CHAP NAS 350 to the computer over communications link 310. The user ID attribute will contain the key ID, character mapping ID, encryption algorithm ID, seed, routing information and the encrypted user ID. The password attribute will contain the hashed encrypted password.

NAS 42 or CHAP NAS 350 will transmit the RADIUS authentication request to ISP 30. ISP 30 examines the routing information included as part of the NAI and determines that the RADIUS authentication request must be forwarded to platform 150 for processing. ISP 30 does not examine the password attribute or the CHAP challenge attribute if present. The RADIUS authentication request is forwarded to Authentication, Decryption, and Routing System 200 via Internet 40 or via private data communications circuit 222.

When Authentication, Decryption, and Routing System 200 receives the authentication request, Authentication, Decryption, and Routing System 200 requires the correct decryption algorithm, correct decryption key, and the correct seed to decrypt the authentication request. Additionally, Authentication, Decryption, and Routing System 200 determines if CHAP is used, as this will affect the password decryption process that must be applied.

In an embodiment where NAS 42 uses PAP or SSL to authenticate computer 110, Authentication, Decryption, and Routing System 200 retrieves decryption keys from a key table residing in a secure, encrypted database. The keys remain memory resident to improve decryption performance. The seed is determined by applying an algorithm against the NAI portion of the authentication request to separate the routing information, the seed value, and user ID. Once both the user ID and password have been decrypted, they are passed from Authentication, Decryption, and Routing System 200 to remote RADIUS server 190 in a new RADIUS authentication request. In order to ensure the security of authentication requests sent between Authentication, Decryption, and Routing System 200 and remote RADIUS server 190, IPSec tunnel 188 is used to transport these requests. Once the authentication request has been processed by server 190, a response is returned to platform 150, then to the ISP, and finally to NAS 42.

In another embodiment where CHAP NAS 350 uses CHAP to authenticate computer 110, Authentication, Decryption, and Routing System 200 retrieves decryption keys from a key table residing in a secure, encrypted database. The keys remain memory resident to improve decryption performance. The seed is determined by applying an algorithm against the NAI portion of the authentication request to separate the routing information, seed value, and the user ID. Once the user ID has been decrypted, Authentication, Decryption, and Routing System 200 queries database 300 containing cleartext user IDs and cleartext passwords. Authentication, Decryption, and Routing System 200 verifies the password provided in the RADIUS authentication request. Authentication, Decryption, and Routing System 200 takes the same key, seed, decryption algorithm and character mapping that was used to decrypt the received encrypted user ID, and encrypts the cleartext password just retrieved from database 300. At this point, Authentication, Decryption, and Routing System 200 has the identical ciphertext string that was created by client 100 when it encrypted the user ID before passing it to computer 110. Authentication, Decryption, and Routing System 200 then retrieves the random number from the CHAP challenge attribute that was included in RADIUS authentication request, the random number having been generated by CHAP NAS 350. Authentication, Decryption, and Routing System 200 then takes the random number and algorithmically mixes it with the encrypted password it just calculated using the same hashing function such as MD-5 that was originally used by computer 110. The results of this operation are compared with the contents of the password attribute in the RADIUS authentication request. If the two values match, the user's password has been authenticated. If the two values do not match, it is treated by Authentication, Decryption, and Routing System 200 as an invalid password and an authentication failure. Once the authentication request has been processed by Authentication, Decryption, and Routing System 200, a response is returned to platform 150, then to ISP 30, and finally to CHAP NAS 350.

If authentication was successful, the user is granted Internet access. Responses to authentication requests do not contain any user credentials, only a RADIUS transaction identifier and an access granted/access denied indication. Therefore, encryption of responses to authentication requests is not needed.

Figure 6A:
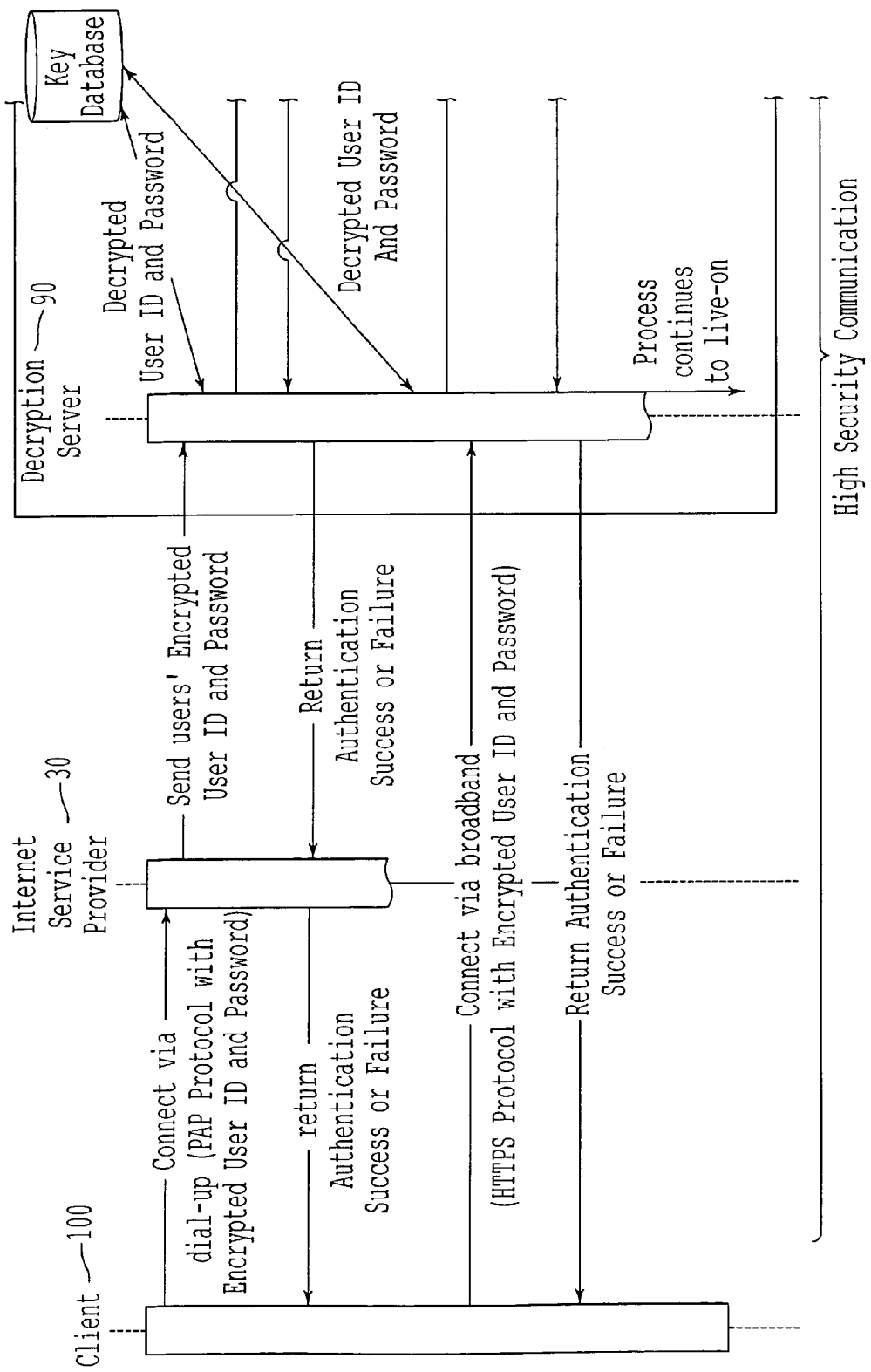
FIGS. 6A and 6B are a schematic diagram of an embodiment of the present invention where the user ID and password are encrypted by the client and decrypted by the authentication server.
Figure 6B:
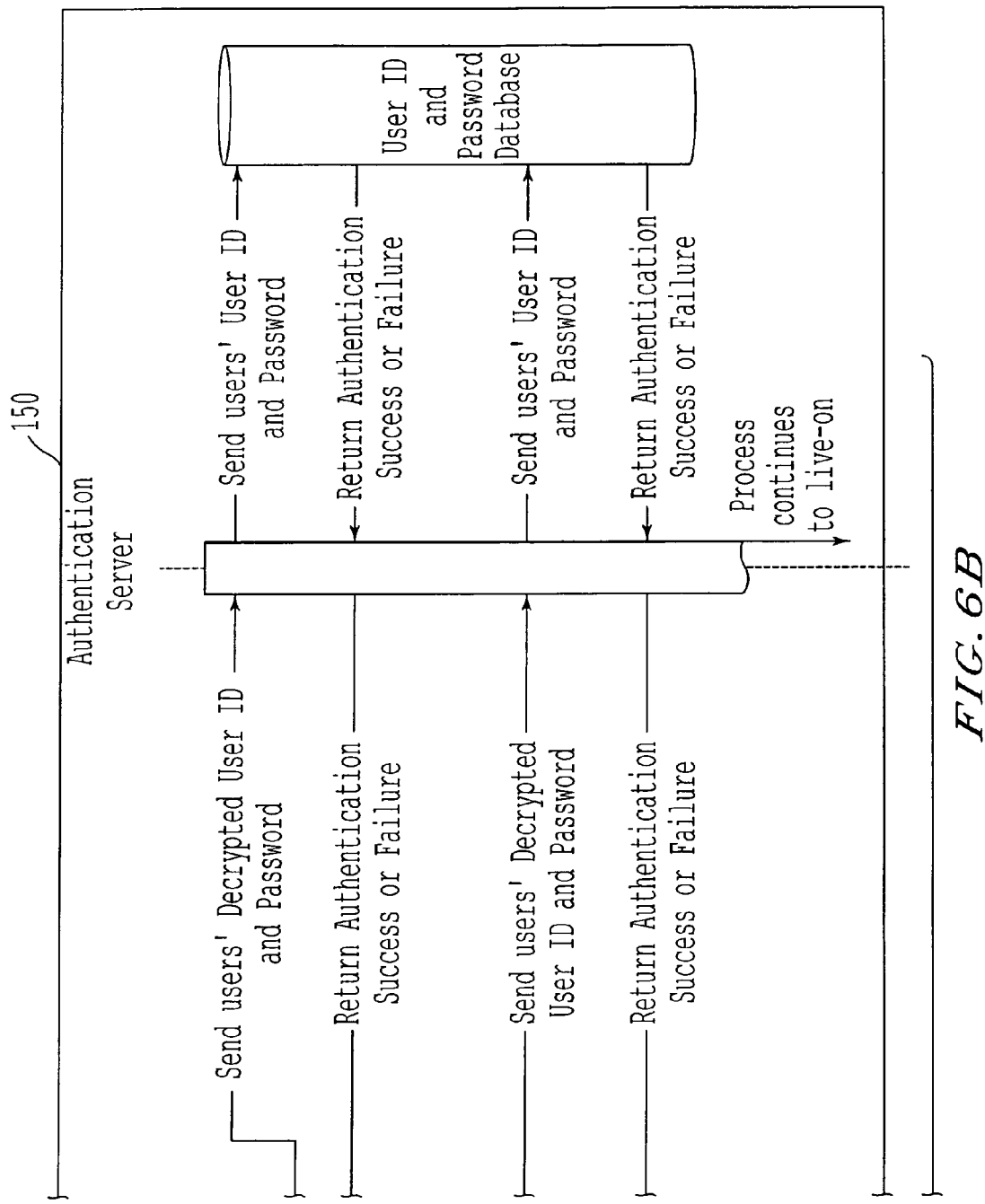

Since NAS 42 and CHAP NAS 350 are presented with an encrypted user name in the authentication request, all RADIUS accounting messages and provider call records reference an encrypted user ID. Since there may be one or more intermediate parties involved in the exchange of accounting information, utilizing encrypted user IDs in accounting records further helps to prevent the compromise or theft of a user ID. Accounting Record Decryption System 250 decrypts user names in RADIUS accounting messages and provider call records with the same method used by Authentication, Decryption, and Routing System 200 to decrypt authentication requests. Platform 150 forwards decrypted RADIUS accounting messages to remote RADIUS server 190 in real time. FIGS. 6A and 6B illustrate the flow of data in an embodiment of the present invention where the user ID and password are encrypted by the client and decrypted by the authentication server.

Figure 7:
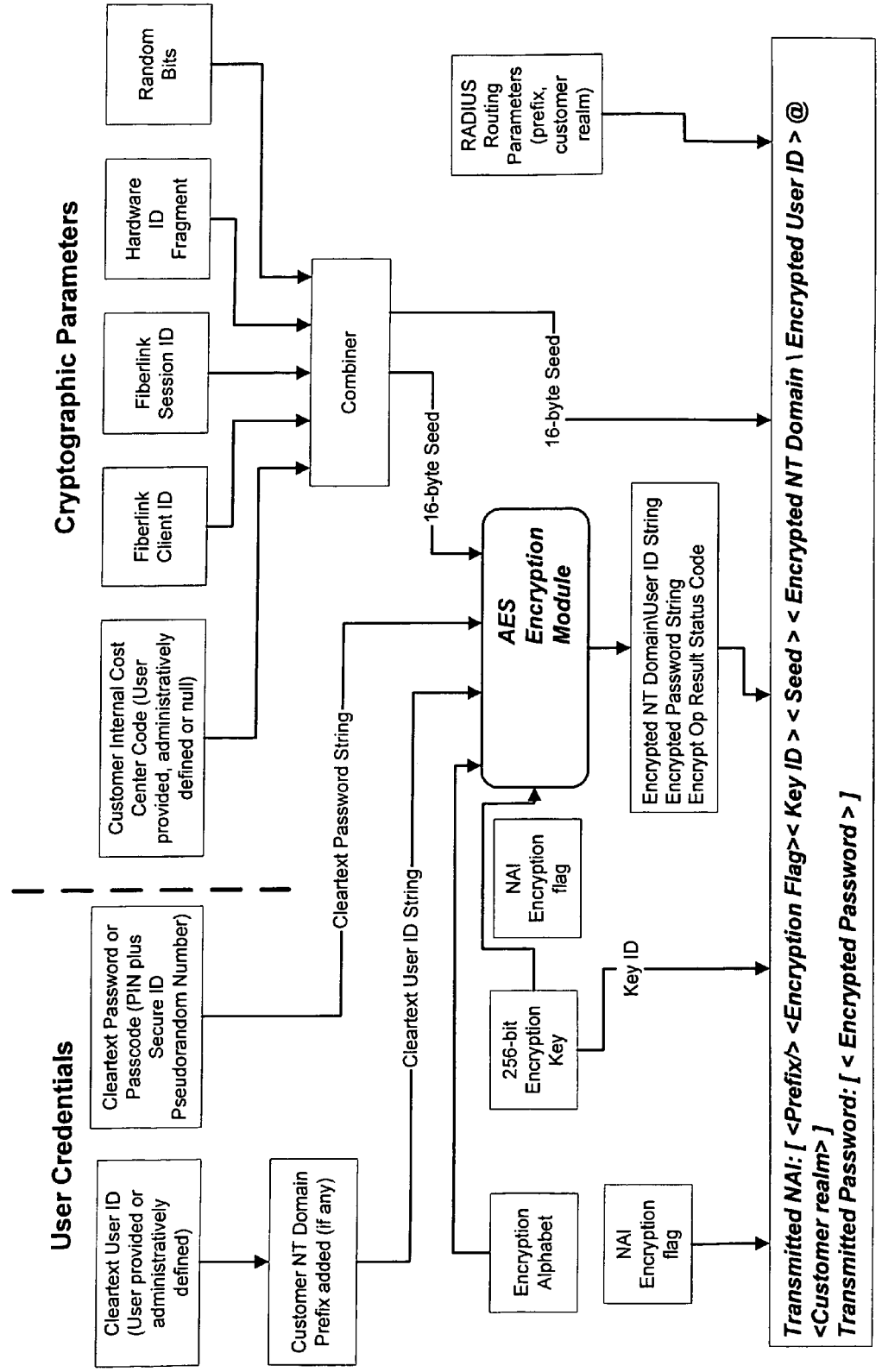
FIG. 7 is a block diagram of the encryption process of an embodiment of the present invention.
Figure 8:
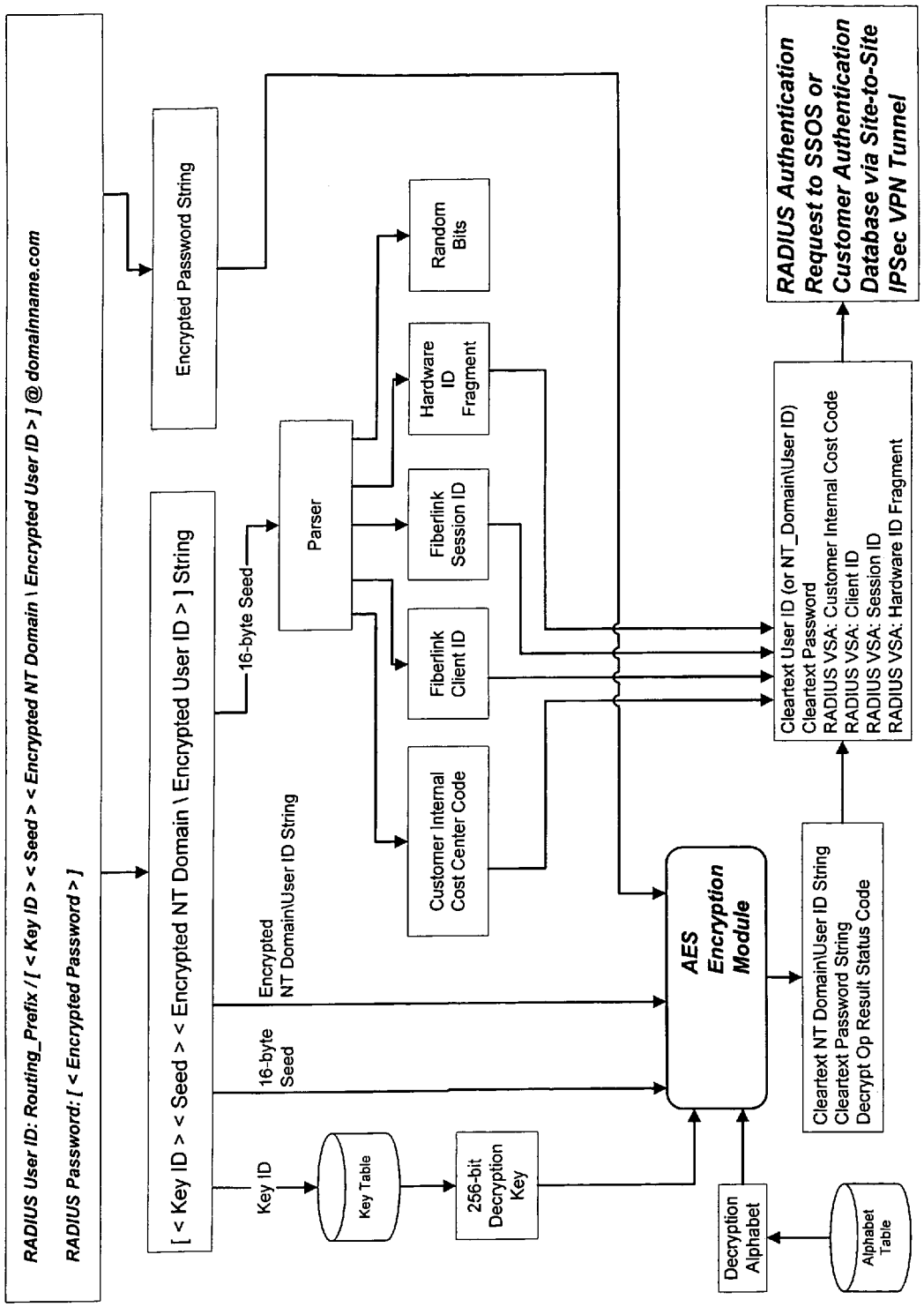
FIG. 8 is a block diagram of the decryption process of an embodiment of the present invention.

In one embodiment, encryption is performed using RSA's implementation of the AES encryption algorithm, using a 256-bit key and a 128-bit seed to secure user Internet authentication credentials transmitted over public or un-trusted data communications networks—including, but not limited to: dial up, LAN, Wi-Fi, wired roaming broadband, telecommuter broadband, 2.5G/3G wireless, Code Division Multiple Access (CDMA), General Packet Radio Service (GPRS), and Personal Handyphone System (PHS) networks. (The encryption and decryption processes are shown in FIGS. 7 and 8). Alternatively, embodiments that utilize a different encryption algorithm, e.g. RC4 or ECC, and/or a different key length are contemplated. These modifications are within the scope of the invention.

A diagram of the encryption process of an embodiment of the present invention is shown in FIG. 7. In the illustrated embodiment, an encryption key and character mapping system is used to encrypt and decrypt the passwords and IDs. The encryption key and a corresponding key ID are stored in an encrypted data store on client 100. The character mapping system is used to map unsupported characters to supported characters. If the user ID and password consist entirely of alphanumeric characters, it is unlikely that any application that handles the credentials will fail to properly recognize them. However, if certain non-alphanumeric characters are used, errors may be caused in one or more applications. For example if the character "#" is used as part of a user ID or password, the user authentication transaction may fail because the use of certain characters may cause a failure or error condition in one or more intermediate computers, network devices or computer programs involved in the transaction. Accordingly, in one embodiment, characters that are unsupported by one or more applications are mapped to supported characters. Thus, only supported characters will be present in the resulting ciphertext. For example, characters may be mapped to digits (i.e. "#" mapped to "255"). The present invention may be practiced by mapping none, some, or all non-supported characters to supported characters. Embodiments mapping some or all non-supported characters to supported characters allow greater security, as more choices are available for user IDs and passwords. This also reduces the possibility of an unauthorized person guessing credentials that are common or obvious words, as non-alphanumeric characters can be included in the credentials. (FIG. 19 shows an example of a mapping of some unsupported characters to supported characters.)

In one embodiment, the seed is dynamically generated for each authentication request using bits from the client software ID, the client session ID and additional random bits. In the embodiment shown in FIGS. 4, 5, 6A and 6B, a 16-byte seed value is constructed by combining the following data: 4 characters from a session number, 4 characters from a client serial number, 4 characters from a hardware identifier, 2 characters from an internal cost code, and 16 random bits (65,536 possible values). Alternatively, embodiments that generate a 16-byte seed using different data elements, different length data elements, or using only random bits are contemplated. In addition, embodiments that generate a different length or size seed are also contemplated. These modifications are within the scope of the invention.

Since the session ID changes on every connection attempt, it can be used by the platform 150 to determine and baseline the last good session ID seen from that user. Subsequent authentication requests received by platform 150 with the same or lower session IDs are rejected. Since the session ID is used in the encryption and decryption process, the unauthorized removal or modification of the session ID causes a difference between the inputs used in the encryption process and the inputs used in the decryption process. This difference causes the decrypted ciphertext to differ from the encrypted clear text. Since the decrypted ciphertext does not match the user ID and password entered by the user, erroneous "credentials" are presented to the authentication database and authentication fails. Accordingly, only authentication requests originating from client 100 and containing good session IDs are successfully processed by platform 150.

In one embodiment, Authentication, Decryption, and Routing System 200 looks up the client ID and domain in a local table that tracks the previous session ID and last used time. If the client ID and domain are not found in the database, the session ID is accepted. If the value of the session ID in the request is greater than the stored session ID, then the session ID is accepted. If the previous session ID is equal to the maximum value of the session ID, then the session counter has rolled over and the ID is accepted. If the value of the session ID is less than the stored session key, authentication fails. No further processing of the request takes place. If the session ID is equal to the previous session ID, and the last-used time is within a pre-defined time interval, then the ID is accepted. If the session key is equal to the previous session ID, and the last-used time is outside of a pre-defined time interval, authentication fails. No further processing of the request takes place. If the ID is accepted, the password and user name in the access request are decrypted and forwarded to RADIUS server 190 for authentication. (Decryption may fail however, also leading to an authentication failure). RADIUS server 190 replies with an Access-Reject or an Access-Accept response. If the reply is a reject, then there is no further session processing. An Access-Reject packet is returned to ISP 30. If the reply is an Access-Accept and the session ID record does not exist in the master database, one is created with the current username, domain, session ID, and timestamp. If the session ID record for the client ID and domain exists in the master database, the session ID in the current request replaces the stored session ID, and the last used timestamp is set to the current time. An Access-Accept packet is then returned to ISP 30.

Information needed by platform 150 to determine the seed that is used for encryption is also embedded in the authentication request using an algorithm. The seed changes for every authentication request. A different seed for each authentication request ensures that no two individual requests are encrypted the same way. This makes it very difficult to duplicate and hack the authentication process.

To enhance security, keys can have finite life expectancies. A key's lifetime is an administratively defined property for each key. The key lifetime can be set to any number of days, months, or years. The key lifetime can be changed at any time via Authentication, Decryption, and Routing System 200, and in extreme circumstances a key can be disabled immediately. When a key is approaching its end of life, a new key is issued and automatically distributed to clients 100 via an automatic update capability. Over time, as users connect, they receive an update containing the new key and a new character mapping table and client 100 stops using the older key and older character mapping table. The longer the amount of time where there is more than one valid key and mapping table, the greater the percentage of users migrated automatically to the new key and mapping table. Client 100 facilitates a smooth key migration process by displaying update notifications (similar to password expiration notifications) on user's computer 110 when the key expiration date is approaching to notify users that they must update their settings within "X" days. Users can also update their key and mapping table at any time over a LAN connection by manually initiating the client's one-click update feature. Users that have not received an updated key when their key is administratively expired are unable to authenticate. That user is still able to receive a new key by manually initiating an update over a broadband connection.

Users that have not received an updated character mapping table when their mapping table is administratively changed on Authentication Decryption and Routing System 200 are unable to authenticate. The change on Authentication Decryption and Routing System 200 causes a difference between the inputs used in the encryption process on client 100 and the inputs used in the decryption process (FIG. 8). This difference causes the decrypted ciphertext to differ from the encrypted clear text. Since the decrypted ciphertext does not match the user ID and password entered by the user, erroneous "credentials" are presented to the authentication database and authentication fails. Accordingly, only authentication requests originating from client 100 and containing good character mapping tables are successfully processed by platform 150.

In an emergency, a user unable to authenticate due to an expired key can contact an administrator with access to Authentication Decryption and Routing System 200. The administrator has the ability to change the expiration date on a key stored in Authentication Decryption and Routing System 200. By changing the expiration date from, e.g. last week to e.g. tomorrow, the key is returned to a valid state. The user may now re-attempt the authentication transaction, knowing that the key required to decrypt their encrypted user ID and password is now valid.

Because multiple keys and character mapping tables may be outstanding simultaneously, Authentication, Decryption, and Routing System 200 determines which decryption key and character mapping table to use when an encrypted authentication request is received. Embedded in the contents of the authentication request is an indicator that the Authentication, Decryption, and Routing System 200 uses to determine the appropriate decryption key and character mapping table. If the authentication key referenced in the authentication request has expired or does not exist, the decryption process is not performed. Instead, an authentication rejection message is returned to the NAS, which terminates the connection.

FIG. 8 illustrates a decryption process of an embodiment of the present invention. Using the clear text RADIUS realm and key ID contained in the authentication request, a server key database is referenced to retrieve the correct decryption key and character mapping table. If the key has not expired, a server-based AES decryption algorithm uses the decryption key, the character mapping table, the seed, and the supplied encrypted username and password strings to re-constitute the original credentials entered by the user. If the key has expired, decryption is not performed. Instead, an authentication rejection message is returned to the NAS, which terminates the connection.

In one embodiment, the encryption key is generated using key generation libraries from the RSA BSAFE™ SDK. Alternatively, different software tools can be used to generate keys, or the keys can be generated manually by a system administrator. The generated key is stored within an encrypted database on platform 150. Each key generated is valid for a single realm and has a fixed expiration date. The same key can be used for different realms if desired. The key is distributed to client 100 in an update and is used by platform 150 in the decryption of the user's credentials. The key database allows for the storage of multiple keys for a single RADIUS realm. Prior to a key expiring, new keys are defined and automatically downloaded to client 100 during their next session. This by definition means multiple keys are valid (not expired) and in use by client 100. The expiring and rotation of keys allows for a rapid re-keying rate.

Figure 9:
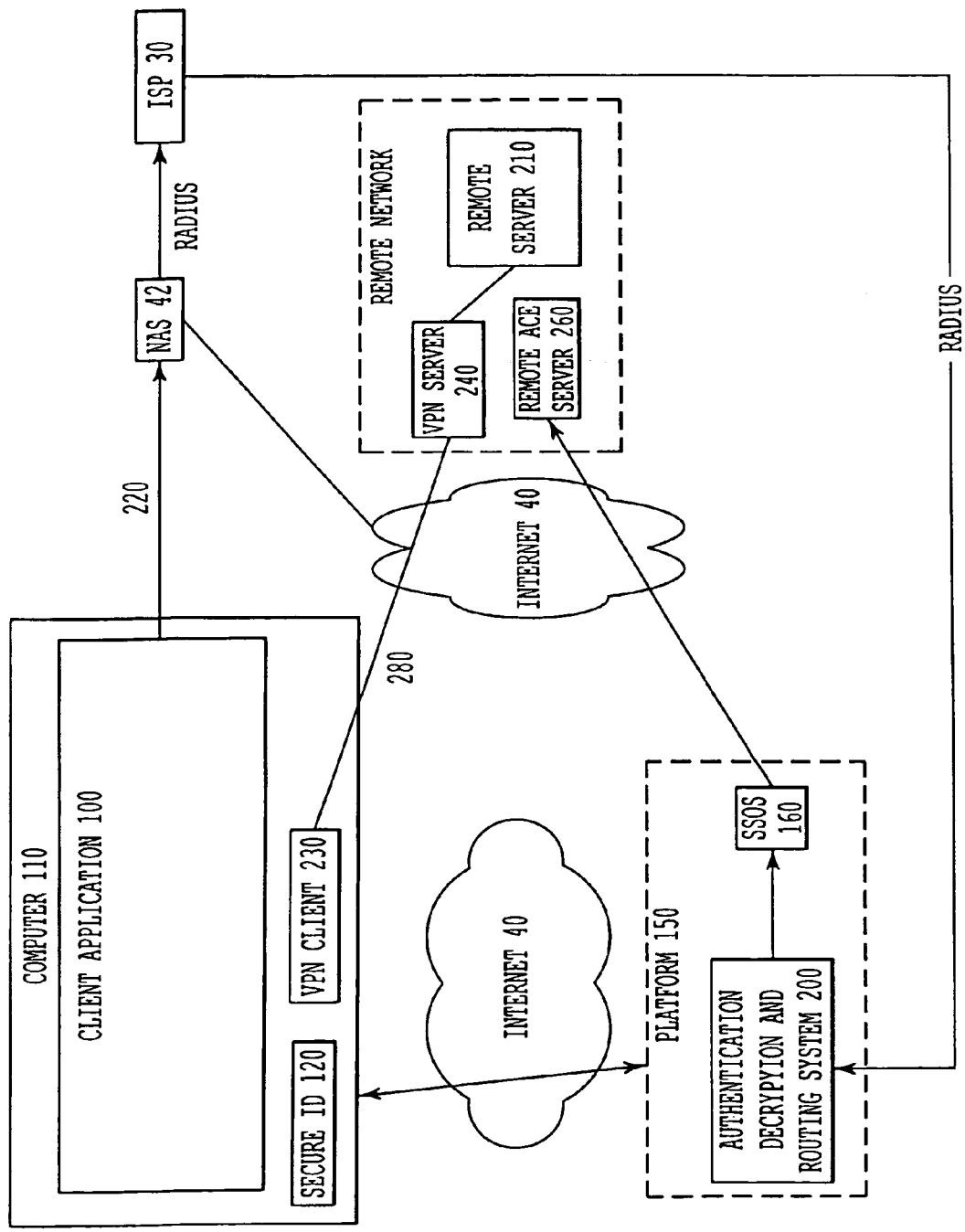
FIG. 9 is a block diagram of an embodiment of the present invention using one-time tokens for authentication.

In one embodiment, two-factor authentication and/or one-time passwords (i.e. non-reusable passwords) are used to enhance security. For example, ACESERVER 260 and SECUREID 120, marketed by RSA Security, Inc., are incorporated into the system as shown in FIG. 9. In this embodiment, remote RADIUS server 190 shown in FIG. 4 is replaced by remote ACESERVER 260. SSOS 160 intercepts all messages going between Authentication, Decryption, and Routing System 200 and remote ACESERVER 260. An authentication request containing a decrypted user ID and decrypted password is received by SSOS 160 and transmitted in a message to ACESERVER 260 unchanged. Authentication responses from ACESERVER 260 in the form of "Access Permitted" or "Access Denied" messages also pass through SSOS 160 to Authentication, Decryption, and Routing System 200 unchanged. However, SSOS 160 intercepts response messages from ACESERVER 260 that take the form of "New PIN" or "Next Token" messages. Instead of SSOS 160 relaying the ACESERVER's "New PIN" or "Next Token" messages, SSOS 160 originates an "Access Permitted" message which is sent to Authentication, Decryption, and Routing System 200. Additionally, SSOS 160 notes the fact that ACESERVER 260 has an outstanding "New PIN" or "Next Token" request for a specific user.

"Access Permitted" is the message required by NAS 42 to permit the user to access the Internet. When NAS 42 receives this message it grants computer 110 Internet access. At this point, computer 110 is aware that it now has Internet access. However, client 100 intercepts the operating system messages indicating that the user is now connected to the Internet, resulting in the user believing they are still in the authentication stage. Once the client 100 detects that computer 110 is connected to the Internet, the client is able to communicate freely with any other application or server on the Internet. The client sends a Status Inquiry message directly to SSOS 160 inquiring as to whether an outstanding "New PIN" or "Next Token" challenge exists. SSOS 160 responds with a Status Response message indicating either that no challenge is outstanding, a "New PIN" challenge is outstanding, or a "Next Token" challenge is outstanding. If client 100 receives a Status Response message from SSOS 160 indicating no ACESERVER challenge is outstanding, client 100 communicates to the user that they are now connected to the Internet, resulting in the user understanding that the authentication stage has successfully completed and they are able to access Internet 40. The user may now launch VPN client 230. Alternatively, client 100 may now launch VPN client 230. Further, in one embodiment, client 100 may include a VPN client capability, rendering VPN client 230 unnecessary. In such an embodiment, client 100 may automatically launch its VPN capability when an Internet connection is created, or it may wait for a prompt from a user to create a VPN connection. These modifications are within the scope of the invention.

If client 100 receives a message from SSOS 160 indicating a "New PIN" challenge is outstanding, it displays a message to the user that they must enter a new PIN. Client 100 transmits a message containing the information submitted by the user to SSOS 160. SSOS 160 then originates a "New PIN" response message and sends it to ACESERVER 260 as if it had originated from the user. ACESERVER 260 generates a transaction successful/failed status message and transmits it to SSOS 160. SSOS 160 then generates a transaction successful/failed status message and transmits it to client 100. If the transaction is successful, client 100 communicates to the user that they are now connected to the Internet, resulting in the user understanding that the authentication stage has successfully completed. If the transaction fails, client 100 displays an error message to the end user and gives them an opportunity to retry or abort. After a configurable number of retry attempts, client 100 may disconnect computer 110 from Internet 140.

If client 100 receives a message from SSOS 160 indicating a "Next Token" challenge is outstanding, it displays a message to the user that they must enter a new random number from their SECUREID 120. Client 100 transmits a message containing the information submitted by the user to SSOS 160. SSOS 160 then originates a "Next Token" response message and sends it to ACESERVER 260 as if it had originated from the end user. ACESERVER 260 generates a transaction successful/failed status message and transmits it to SSOS 160. SSOS 160 generates a transaction successful/failed status message and transmits it to client 100. If the transaction is successful, client 100 communicates to the user that they are now connected to the Internet, resulting in the user understanding that the authentication stage has successfully completed. If the transaction fails, client 100 displays an error message to the end user and gives them an opportunity to retry or abort. After a configurable number of retry attempts, client 100 may disconnect computer 110 from Internet 140.

In one embodiment, the authentication messages require a passcode made of a token (a pseudo-random number from SECUREID 120) and a PIN. From the perspective of intermediate entities involved in the Internet authentication transaction, the passcode is indistinguishable from a password. It is a series of characters that is labeled as a password in RADIUS authentication requests and conventional RADIUS authentication request processing. Alternatively, embodiments requiring a passcode including only a token or just a PIN are contemplated. Further, SECUREID 120 may be configured as software that is part of computer 110, automatically providing a token to client 100, or SECUREID 120 may be separate from computer 110 requiring the user to enter the token displayed by SECUREID 120 into computer 110. These modifications are within the scope of the invention.

Figure 10:
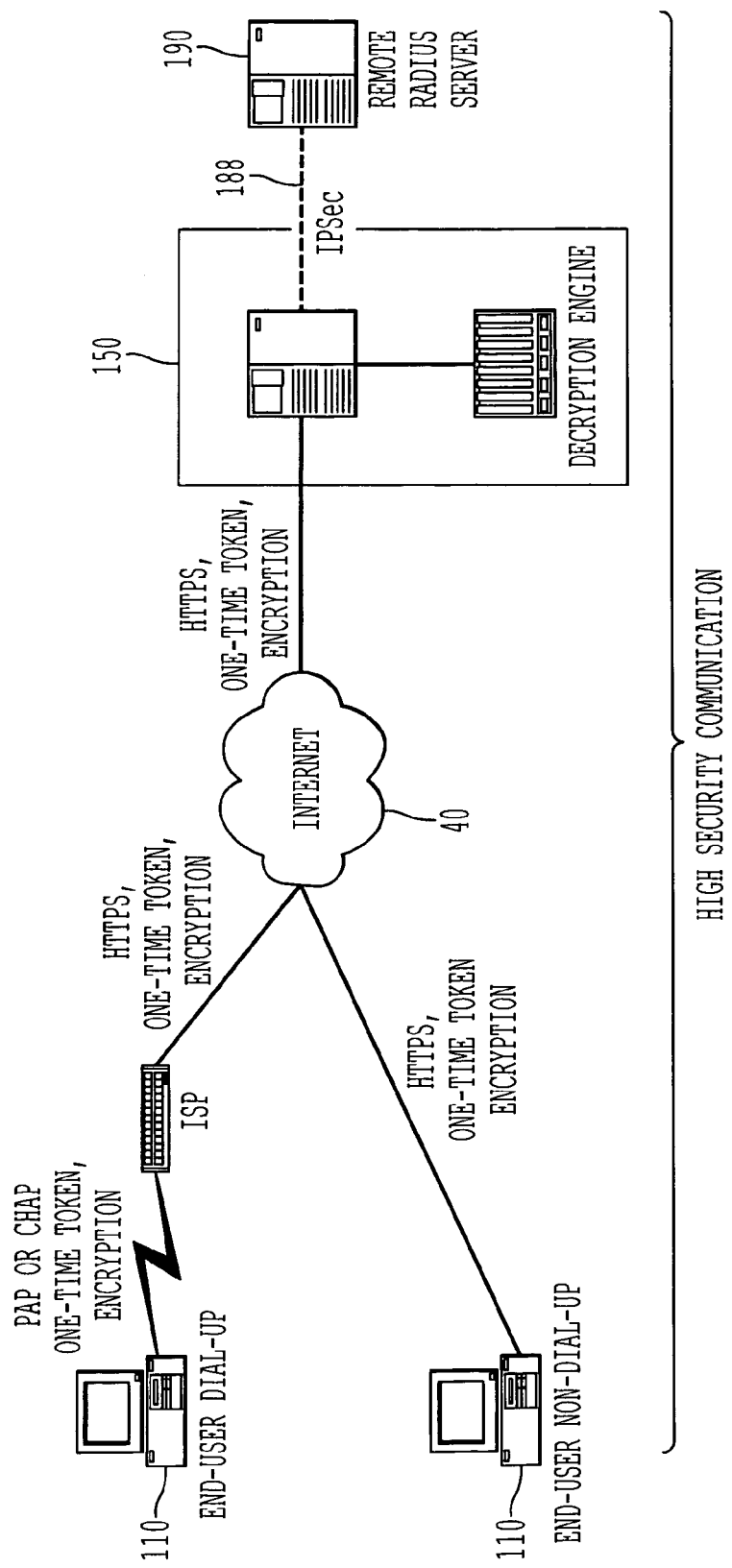
FIG. 10 is a schematic diagram of an embodiment of the present invention using one-time tokens for authentication.
Figure 11:
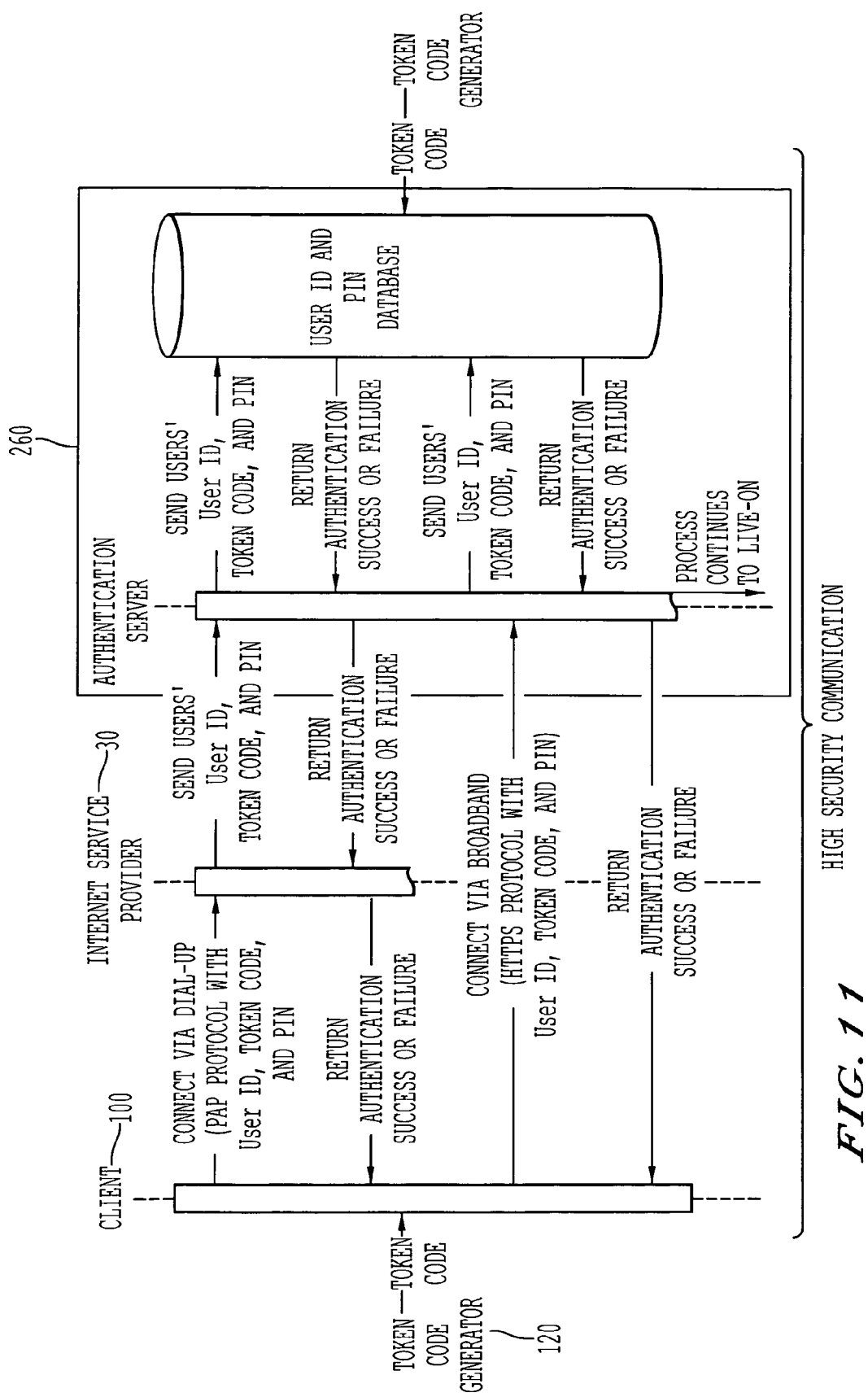
FIG. 11 is a schematic diagram of an embodiment of the present invention using one-time tokens for authentication.

Thus, SSOS 160 and client 100 permit the RSA ACESERVER and SECUREID solution, which was designed for LAN based authentication to be used for Internet dial, Internet ISDN, roaming Wi-Fi, roaming broadband, cellular, and/or PHS authentication as well. This allows the use of the strong security features of the RSA two-factor authentication and one-time password solution in an Internet dial environment. FIGS. 10 and 11 illustrate an embodiment of the present invention using one-time tokens for authentication.

In one embodiment of the present invention, client 100 is configured to ensure that connection of computer 110 to remote server 210 does not "infect" server 210. This is accomplished by defining specific, named applications that are not permitted to run when a user is connected to the Internet or connected to server 210 via VPN connection 280 between VPN client 230 running on user's computer 110 and VPN server 240 (also known as a VPN Concentrator or VPN Gateway). Further, a list of specific applications that must be running during an Internet or VPN connection is also defined. The client monitors for these applications when connected to the Internet or server 210, and takes appropriate actions when non-compliance is detected. Enforcement actions the client can take when a prohibited application is found include: logging the event, notifying the user, disconnecting from the Internet and/or disconnecting the VPN tunnel. Disconnecting from the Internet causes the loss of transport required to maintain a VPN connection between VPN client 230 and VPN server 240, thus causing VPN connection 280 to fail.

The list of named prohibited and required applications the client monitors for are defined via configuration or "policy" settings. For example, a list of prohibited applications may include viruses, spyware, file sharing applications, instant messaging applications, unlicensed applications, or other applications the system manager does not want end users to be able to ever run on computer 110, to run when connected to Internet 40, and/or to run when connected via VPN tunnel 280 to remote server 210. A list of required applications may include firewall applications, anti-virus applications, and other applications the system manager wants end users to be running on computer 110 at all times, running when connected to Internet 40, and/or running when connected via VPN tunnel 280 to remote server 210. The list of prohibited and required applications is modified by downloading a policy update to the client each time the client accesses the Internet, and as such can be modified at any time. In fact, in one embodiment, every time client 100 connects to the Internet, the client queries an update server to determine if there are any pending policy, software, or phone book updates that should be downloaded and applied. Users also have the ability to manually refresh their settings at any time. Encryption keys (discussed above) may also automatically be distributed and updated in conjunction with or separately from policy updates using this capability without any needed intervention by the user.

Further, users of client 100 and server 210 may be divided into user groups. Policies may be created for individuals or for groups, and may be updated individually or for a group. Each member of the group then receives the policy updates as discussed above, efficiently managing the access security of server 210. Specific encryption/decryption keys may also be assigned to specific groups or individuals and included in the group or individual policy. The keys may also be assigned to users and distributed separately from policies as stated above. Key lifetimes, encryption algorithms, character mappings, key lengths, seed lengths, seed/user ID mixing algorithms, and/or seed components may all be assigned to specific groups or individuals and included in the group or individual policy. These modifications are within the scope of the invention.

Client 100 provides a generalized and extensible framework for starting, stopping and/or restarting other client applications residing on computer 110 at any point when the client is running, when the user is using a specific transport, when the user is connected to the Internet and/or when the user is connected via VPN tunnel 280 to VPN server 240 and remote server 210. The capabilities of client 100 are tailored to security applications such as VPN clients, personal firewalls, and anti-virus products. However, the client's capabilities can also be used for any arbitrary application.

The list of applications to be started, when to start them, when to stop them, whether to restart them, how to start them, whether they must be running in order for a user to can connect to the Internet, whether they must be running in order for a user to connect to server 210 via VPN tunnel 280, etc. are all defined via policy settings.

In one embodiment, this is implemented by the following process. Many standalone IPSec VPN clients 230, as with many other applications in general, self-control their behaviors and their operation based on configuration settings. These configuration settings are often stored in initialization files. These initialization files are often stored in clear text and so are directly accessible to users. These applications normally do not run properly or run at all if the initialization file is not accessible at the time the application starts.

Client 100 contains all of the parameters necessary to create the initialization file used by VPN client 230 shown in FIG. 4 or 9. Client 100 also provides a user control and an automated control for starting VPN client 230 once a connection to the Internet has been established. When VPN client 230 is installed with client 100, VPN client 230 is installed without the required initialization file. Additionally, client 100 searches for and deletes any VPN client initialization files that it finds. When it is appropriate to start VPN client 230, client 100 verifies that certain prerequisites have been met (e.g. prohibited applications are not running, required applications are running, etc.) and only when those preconditions have been met, client 100 creates the initialization file required by VPN client 230 and puts it in the directory on the computer where VPN client 230 looks for it. Client 100 then starts the VPN client. The VPN client looks for the required initialization file, finds it, reads it and initializes itself based on the contents of the file. Client 100 then deletes the initialization file again, preventing unauthorized use of the initialization file.

Using this facility, a user cannot establish VPN connection 280 until client 100 has created the initialization file required by VPN client 230. Since client 100 does not create the initialization file until other prerequisites have been met (e.g. firewall and anti-virus applications are running), this ensures that the user cannot initiate VPN connection 280 until computer 110 has been verified to be safe from security threats and/or verified to be fully compliant with all required application policies and/or prohibited application policies. Thus server 210 is assured that only trustworthy computers are establishing VPN connections 280 thereto. In one embodiment, the contents of the VPN client initialization file are stored in client 100 as policy settings in an encrypted data store. The VPN client configuration settings can be modified using the policy update capability previously described. They cannot be modified by a user of computer 110 since they are stored in an encrypted data store and the user does not have access to the data store decryption key.

In one embodiment, client 100 is a Windows-based application written in Visual C++ that includes an SSL-based VPN client 230 that can be used to communicate via Hypertext Transfer Protocol-Secure Sockets Layer (HTTP-SSL) to an HTTP-based VPN server 240. Other encryption/tunneling protocols such as TLS can also be used between a VPN client and a VPN server and such modifications are within the scope of the invention. This capability can be used to automatically log the user into an HTTP-based access control gateway once the user is connected to the Internet, without requiring the user to open their web browser, type in or select the appropriate Universal Resource Locator (URL), and type in their login credentials when they reach the access gateway's login page. In another embodiment, the client 100 includes IPSec-based VPN client 230 that can be used to communicate via Internet Engineering Task Force (IETF) IPSec protocols to IPSec-based VPN server 240. This capability can be used to automatically establish the IPSec VPN connection to IPSec-based VPN server 240 once the user is connected to the Internet, without requiring the user to install, have, or use external, third-party IPSec-based VPN client 230.

Since client 100 is able to monitor other applications running on computer 110 and can assess the overall compliance with defined policies, client 100 is able to include in login requests, or can notify the VPN access control gateway 240 at any time, what applications required to be running are not (e.g. firewall applications), and conversely what applications prohibited from running are (e.g. spyware, unlicensed applications, or other applications deemed undesirable by a system manager). Client 100 can also communicate the relative physical location of computer 110 (e.g. home, branch office, hotel, directly attached to the corporate network, etc.). The access control gateway can use this information to dynamically adapt the list of permissions granted the user, for example denying access to one or more specific applications when the user is at a kiosk computer without antivirus software, or for denying access entirely to VPN server 240 or to server 210.

When client 100 detects a particularly worrisome policy violation, e.g. detection of a virus as reported by an anti-virus application, client 100 can automatically send a logout command to VPN access control gateway 240. This differs from other web access control gateway solutions which wait for a user to open a new web page or click on a link and then piggyback the information onto the next request going from the web browser to the web access control gateway.

In one embodiment, the policy settings are used to determine the connectivity method used. Upon startup of client 100, the client automatically queries what connectivity hardware (network adapters and modems) is currently available on the machine. Client 100 then automatically queries whether or not any of the detected hardware devices has an available network connection. These results are used to provide user feedback regarding which connection methods (analog dial, Integrated Services Digital Network (ISDN) dial, PHS cellular, Wi-Fi wireless, LAN, Code-Division Multiple Access (CDMA) cellular, Global System for Mobile Communications (GSM) cellular, GPRS cellular, etc.) are presently available. Client 100 ranks connectivity methods based on policy settings or user input via a manual control. Client 100 uses these rankings to automatically display the user interface for the most preferred connectivity method out of the available connectivity methods. Based on policy settings, client 100 may be configured to restrict or prevent the display of status or connection controls for one or more specific transports. This allows one code base to support any number of combinations of supported connectivity methods.

In one embodiment, client 100 automatically performs a location type assessment that determines the location type of the user's physical location when computer 110 has a wired or wireless LAN connection. Location types supported include: non-corporate/non-roaming, corporate/non-roaming and non-corporate/roaming. Based on the user's location type, client 100 automatically determines the appropriate authentication method to be used when the user initiates an Internet connection. Client 100 also automatically applies location-specific policies, e.g. pertaining to permitted applications, prohibited applications, whether to automatically launch VPN client 230, what information to send to an HTTP-based, TLS-based, IPSec-based or other encryption method-based VPN server 240 (e.g. the user's location, applications that are running, the user's policy group, etc.), or other policy-defined applications, etc. Additionally, following the assessment(s), client 100 attempts to identify for the user the name of their actual physical location and display this user-friendly location name to the user. This is accomplished using a location name assessment method. When the appropriate policy has been determined, client 100 then accesses the Internet and VPN server 240 as described above.

If the user is determined to be in a commercial roaming broadband location, client 100 automatically selects the roaming broadband authentication method when the user initiates an Internet connection. If the user is determined to not be in a commercial roaming broadband location, client 100 automatically initiates a corporate/non-corporate LAN assessment. The objective of the corporate/non-corporate LAN assessment is to determine whether or not the user is in a corporate broadband location (e.g. corporate headquarters, branch office, division office, manufacturing facility, etc.). If the user is determined to be in a corporate broadband location, client 100 automatically disables any broadband authentication method when the user initiates an Internet connection. If the user is determined to not be in a corporate broadband location, client 100 automatically selects the direct-access broadband authentication method when the user initiates an Internet connection.

Client 100 automatically performs a location name assessment that determines the location name of the of the user's physical location when the user's computer has a wired or wireless LAN connection. Client 100 allows a user or a computer administrator to name or personalize a wired or wireless LAN connection when the user's computer has a wired LAN connection and to automatically select and display the correct name on subsequent uses of that same wired or wireless LAN connection. Client 100 allows security policy settings to be automatically and dynamically tailored on a user's computer based on the location type, when the user's computer has a wired or wireless LAN connection.

Further, in one embodiment, a user sets the properties of a wired or wireless LAN connection in addition to providing a name. The user selects a named or unnamed connection from a list. The user then defines/redefines properties of the connection such as: a name of the connection, a location (e.g. home work, or roaming), enabling/disabling automatic launch of VPN client 230 when a broadband connection is established (this property may be set/overridden by the client policy as well), selection of a VPN server, and/or selection of a device. This information is saved as a bookmark. The saved bookmarks allow a user to quickly determine the properties of each available connection, allowing the user to choose the optimal connection for their configuration. A user or administrator may also delete or modify previously defined bookmarks.

Figure 12:
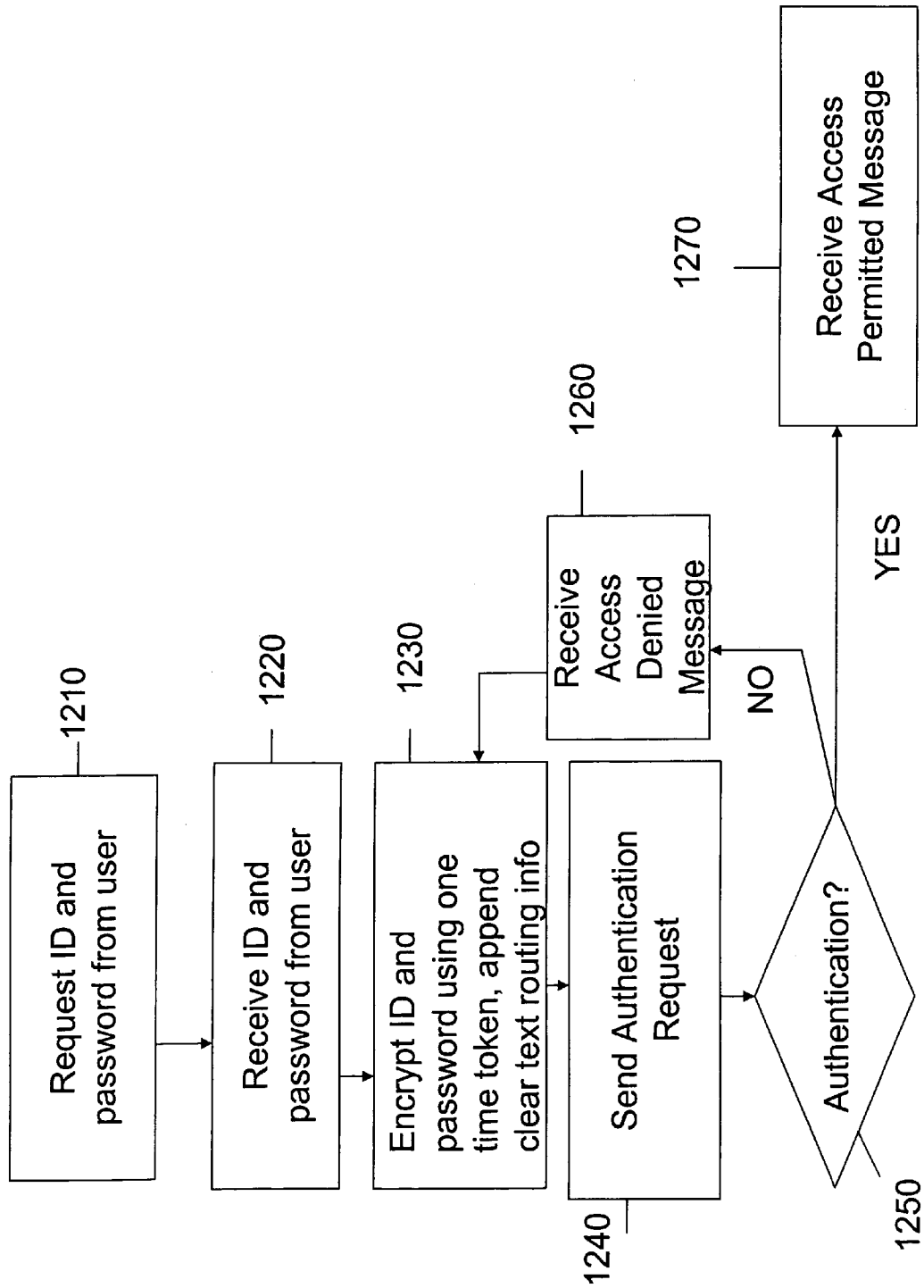
FIG. 12 is a block diagram of an embodiment of a method of the present invention where the user ID and password are encrypted by the client.

FIG. 12 shows the steps in an exemplary method of the present invention where the user ID and password are encrypted by the client. In step 1210, client 100 requests a user ID and password from the user. The client receives the user ID and password in step 1220. The user ID and password are encrypted using a one time seed, and clear text routing information, key ID, and seed are appended in step 1230. This creates the authentication request. The authentication request is sent in step 1240. An authentication decision is made in step 1250. If the authentication message is not verified, the client 100 receives an "Access Denied" message in step 1260. If the authentication message is verified, the client receives an "Access Permitted" message in step 1270.

Figure 13:
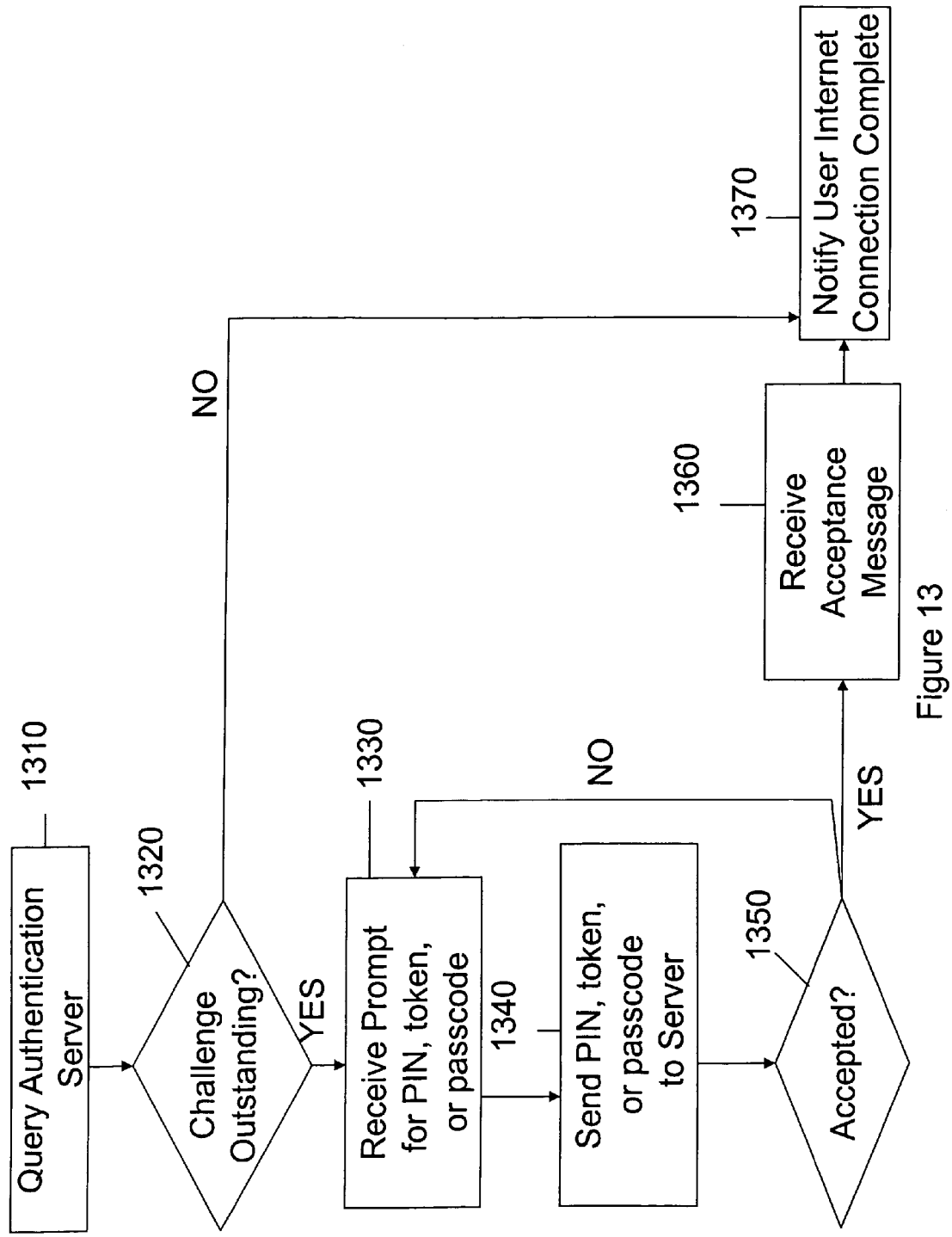
FIG. 13 is a block diagram of an embodiment of a method of the present invention using one-time tokens for authentication.

FIG. 13 shows the steps in an exemplary method of the present invention using one-time tokens for authentication. Client 100 queries SSOS 160 in step 1310. If SSOS 160 indicates that a challenge is outstanding in step 1320, client 100 receives a prompt for a PIN, token, or passcode in step 1330. If no challenge is outstanding, the client notifies the user the Internet connection is complete in step 1370. If a PIN, token, or passcode is required, it is sent to SSOS 160 in step 1340. If this PIN, token, or passcode is accepted by ACES-ERVER 260 in step 1350, client 100 receives an acceptance message in step 1360. Client 100 then notifies the user that the Internet connection is complete in step 1370.

Figure 14:
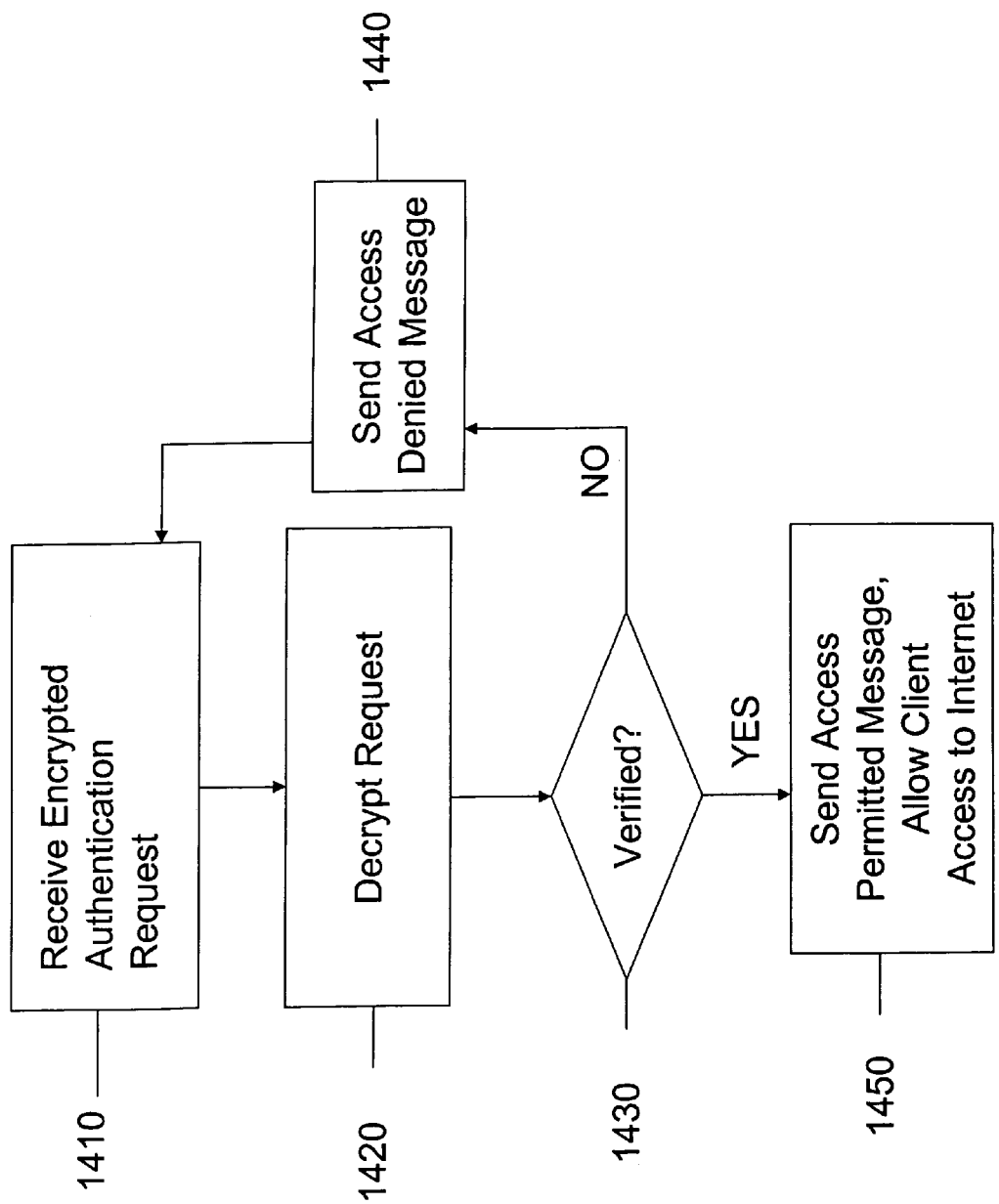
FIG. 14 is a block diagram of an embodiment of a method of the present invention where the user ID and password are decrypted by the authentication server.

FIG. 14 shows the steps in an exemplary method of the present invention where the user ID and password are decrypted by the authentication server. Platform 150 receives an encrypted authentication request in step 1410 and forwards it to the Authentication, Decryption, and Routing System 200. Authentication, Decryption, and Routing System 200 decrypts the request in step 1420. If Authentication, Decryption, and Routing System 200 verifies the authentication request in step 1430, an "Access Permitted" message is sent to NAS 42 via ISP 30 and computer 110 is allowed access to the Internet. If the authentication request is not verified, Authentication, Decryption, and Routing System 200 sends an "Access Denied" message to NAS 42 via ISP 30.

Figure 15:
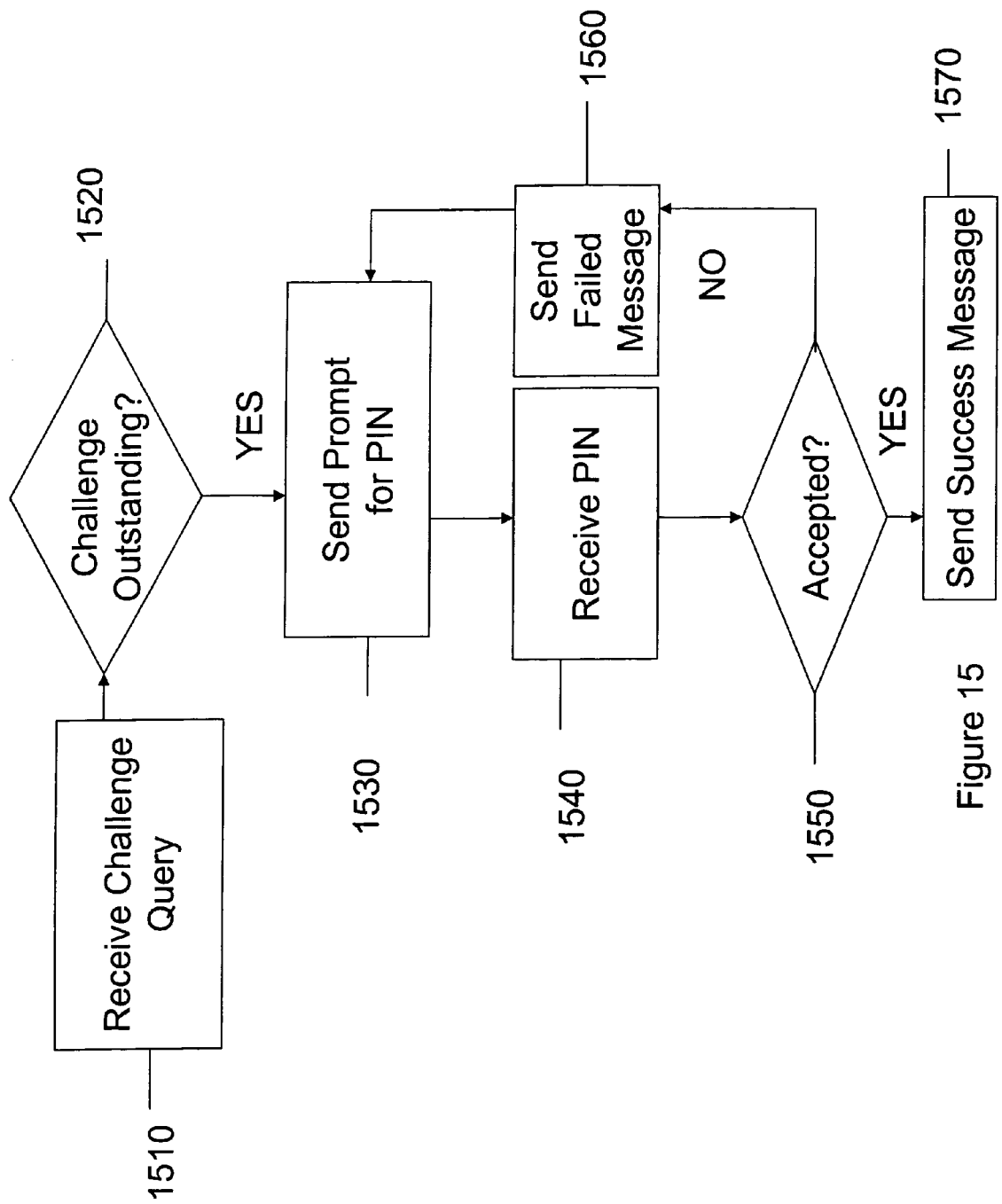
FIG. 15 is a block diagram of an embodiment of a method of the present invention using one-time tokens for authentication.

FIG. 15 shows the steps in an exemplary method of the present invention using one-time tokens for authentication. SSOS server 160 receives a challenge query from client 100 in step 1510. The SSOS then determines if a challenge is outstanding in step 1520. If so, SSOS 160 sends a prompt for a new PIN, token, or passcode to client 100 in step 1530. SSOS 160 then receives the new PIN, token, or passcode message in step 1540 and transmits it in a message to ACESERVER 260. If ACESERVER 260 rejects the new PIN, token, or passcode in step 1550, a failure message is sent by SSOS 160 to client 100 in step 1560. If ACESERVER 260 accepts the new PIN, token, or passcode in step 1550, a success message is sent by SSOS 160 to client 100 in step 1570.

Figure 16:
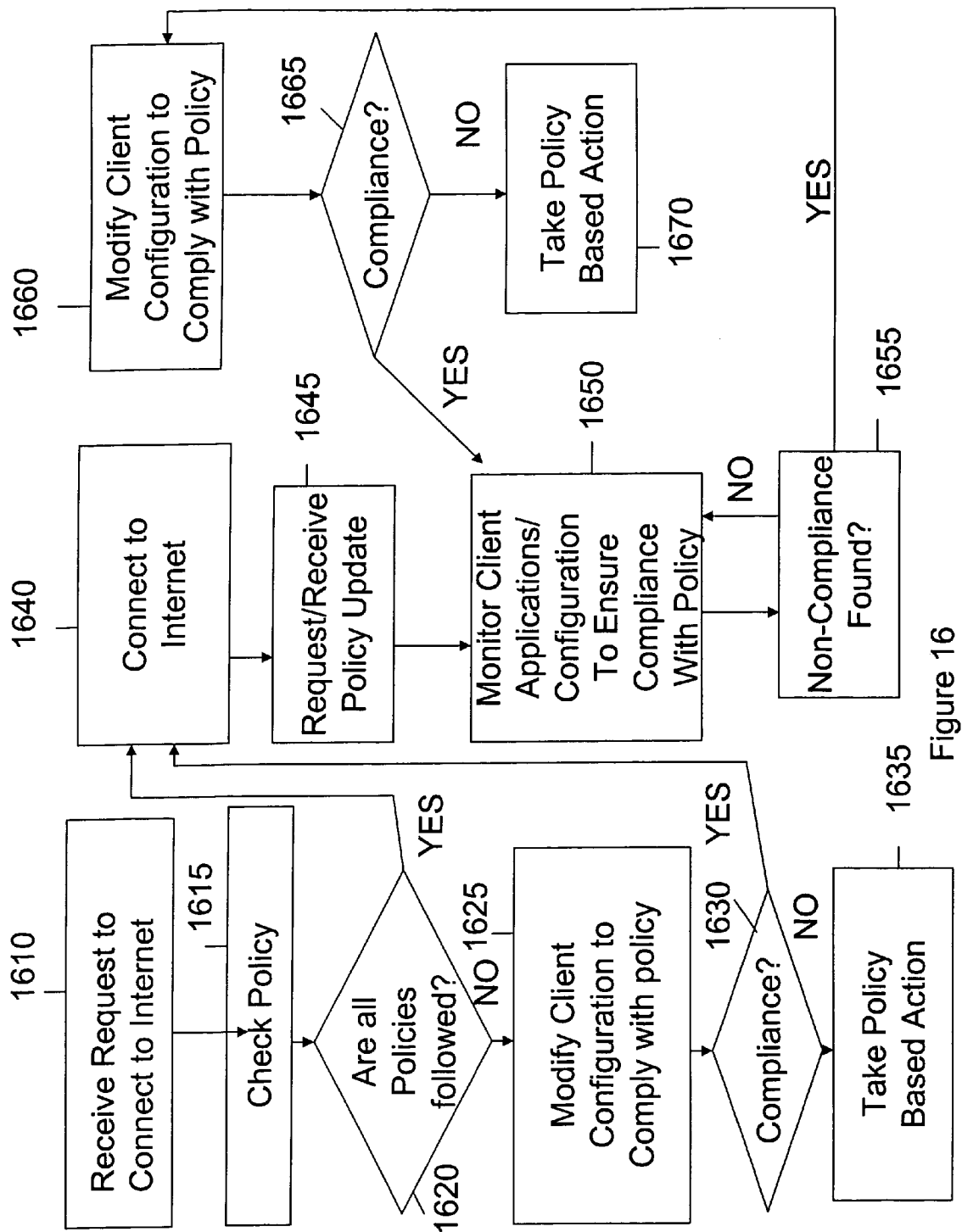
FIG. 16 is a block diagram of an embodiment of a method of the present invention where compliance with a policy is used to ensure server safety.

FIG. 16 shows the steps in an exemplary method of the present invention where compliance with a policy is used to ensure server safety. Client 100 receives a request to connect to the Internet from a user in step 1610. Client 100 then checks the policy in step 1615. Client 100 determines if all the policies are followed in step 1620. If all policies are followed, the client connects to the Internet in step 1640. If not, client 100 modifies the configuration of computer 110 to comply with the policy in step 1625. Client 100 then reevaluates if computer 110 complies with the policy in step 1630. If not, policy based action is taken in step 1635. Policy based action may include refusing an Internet connection, and/or providing visual notification to the user. If computer 110 now complies with the policy, client 100 makes an Internet connection in step 1640.

After an Internet connection is made in step 1640, client 100 receives a policy update from platform 150 in step 1645. Client 100 then continually monitors computer 110 to ensure compliance with the current policy in step 1650. If client 100 finds non-compliance in step 1655, computer 110 is modified to comply with the current policy in step 1660. If computer 110 is then found to be compliant in step 1665, then client 100 returns to monitoring computer 110 in step 1650. However, if client 100 was unable to bring computer 110 into compliance, policy based action is taken in step 1670. Policy based action may include starting or stopping an application, stopping the VPN connection, stopping the Internet connection, and/or providing visual notification to the user.

Figure 17:
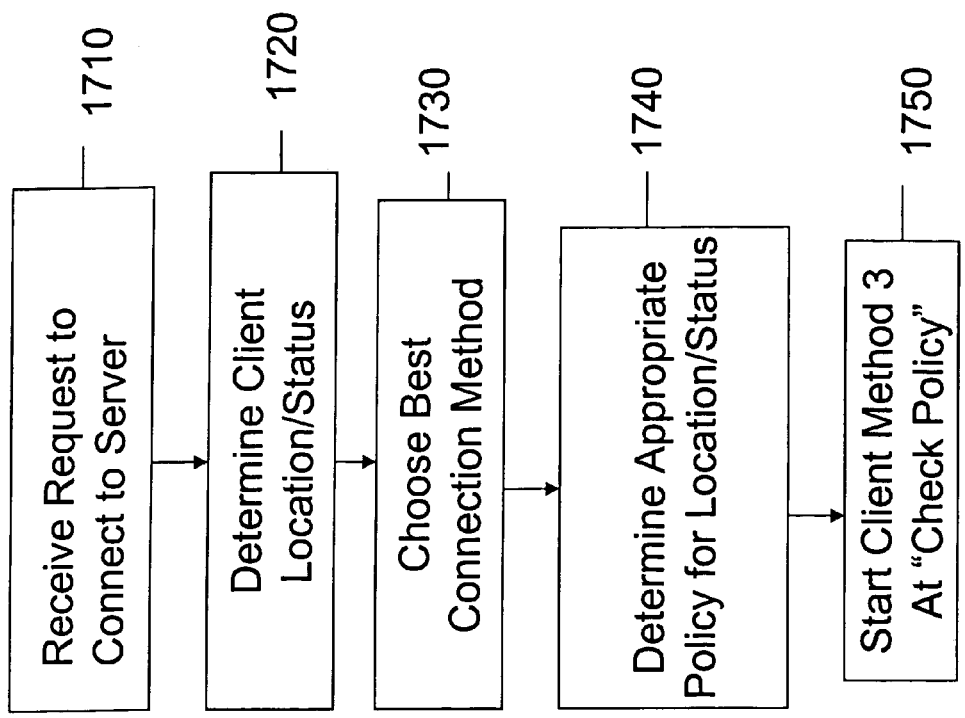
FIG. 17 is a block diagram of an embodiment of a method of the present invention where the user's computer location and status is used to determine an appropriate policy.

FIG. 17 shows the steps in an exemplary method of the present invention where the user's computer location and status is used to determine an appropriate policy. Client 100 receives a request to connect to Internet 40 or to VPN server 240 from a user in step 1710. Client 100 then determines the location and status of computer 110 in step 1720. Based on the location and status determined in step 1720, client 100 determines the best connection method in step 1730. Client 100 determines the best policy for the location and status of computer 110 in step 1740. Client 100 then performs the process shown in FIG. 16 starting at step 1615.

Figure 18:
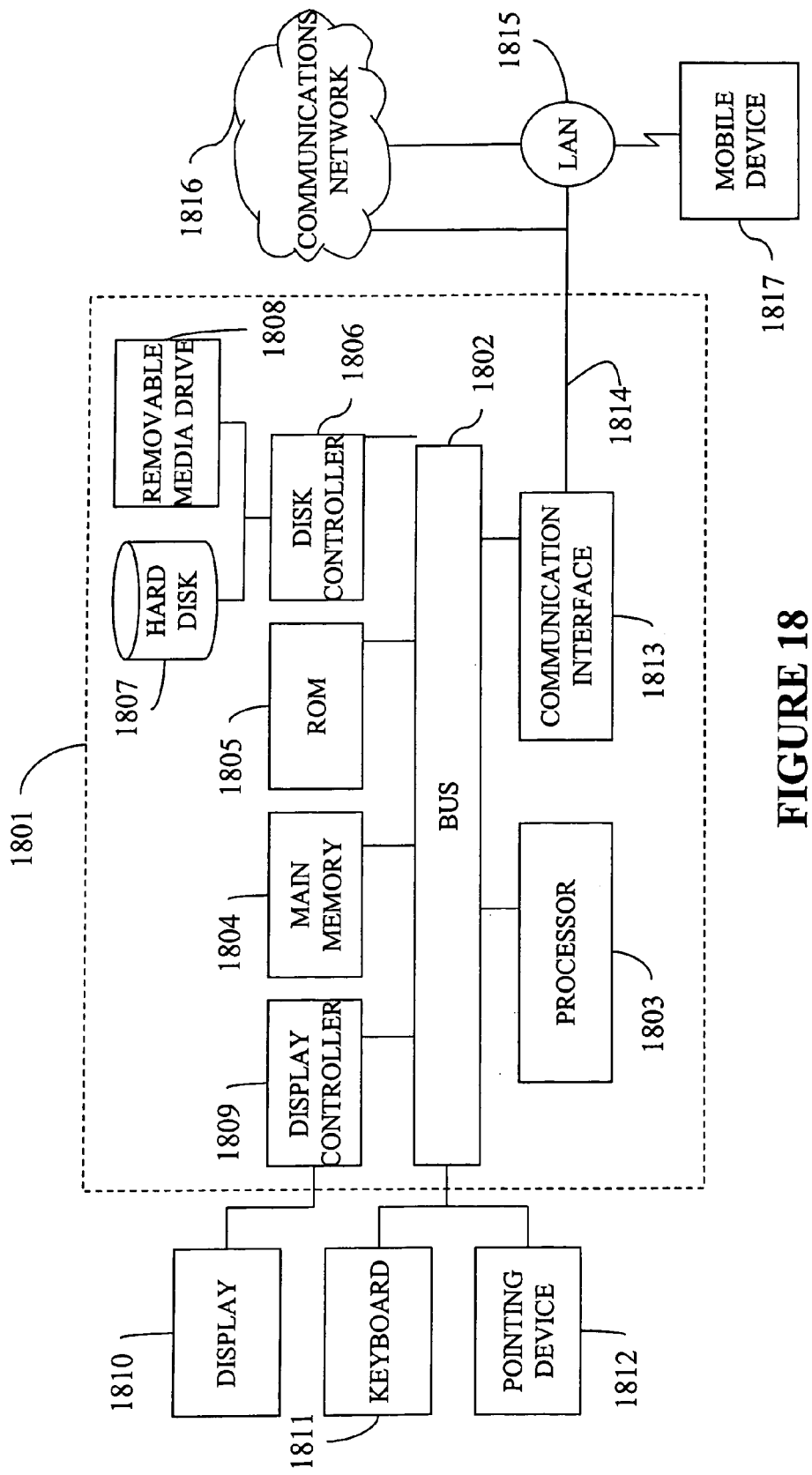
FIG. 18 is a block diagram of an embodiment of a computer upon which an embodiment of the present invention may be implemented.

FIG. 18 illustrates a computer system 1801 upon which an embodiment of the present invention may be implemented. The computer system 1801 includes a bus 1802 or other communication mechanism for communicating information, and a processor 1803 coupled with the bus 1802 for processing the information. The computer system 1801 also includes a main memory 1804, such as a random access memory (RAM) or other dynamic storage device (e.g., dynamic RAM (DRAM), static RAM (SRAM), and synchronous DRAM (SDRAM)), coupled to the bus 1802 for storing information and instructions to be executed by processor 1803. In addition, the main memory 1804 may be used for storing temporary variables or other intermediate information during the execution of instructions by the processor 1803. The computer system 1801 further includes a read only memory (ROM) 1805 or other static storage device (e.g., programmable ROM (PROM), erasable PROM (EPROM), and electrically erasable PROM (EEPROM)) coupled to the bus 1802 for storing static information and instructions for the processor 1803.

The computer system 1801 also includes a disk controller 1806 coupled to the bus 1802 to control one or more storage devices for storing information and instructions, such as a magnetic hard disk 1807, and a removable media drive 1808 (e.g., floppy disk drive, read-only compact disc drive, read/write compact disc drive, compact disc jukebox, tape drive, and removable magneto-optical drive). The storage devices may be added to the computer system 1801 using an appropriate device interface (e.g., small computer system interface (SCSI), integrated device electronics (IDE), enhanced-IDE (E-IDE), direct memory access (DMA), or ultra-DMA).

The computer system 1801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1801 may also include a display controller 1809 coupled to the bus 1802 to control a display 1810, such as a cathode ray tube (CRT), for displaying information to a computer user. The computer system includes input devices, such as a keyboard 1811 and a pointing device 1812, for interacting with a computer user and providing information to the processor 1803. The pointing device 1812, for example, may be a mouse, a trackball, or a pointing stick for communicating direction information and command selections to the processor 1803 and for controlling cursor movement on the display 1810. In addition, a printer may provide printed listings of data stored and/or generated by the computer system 1801.

The computer system 1801 performs a portion or all of the processing steps of the invention in response to the processor 1803 executing one or more sequences of one or more instructions contained in a memory, such as the main memory 1804. Such instructions may be read into the main memory 1804 from another computer readable medium, such as a hard disk 1807 or a removable media drive 1808. The hard disc 1807 may contain one or more databases and data files used by client 100. Database contents and data files may be encrypted to improve security. One or more processors in a multi-processing arrangement may also be employed to execute the sequences of instructions contained in main memory 1804. In alternative embodiments, hard-wired circuitry may be used in place of or in combination with software instructions. Thus, embodiments are not limited to any specific combination of hardware circuitry and software.

As stated above, the computer system 1801 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1801, for driving a device or devices for implementing the invention, and for enabling the computer system 1801 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1803 for execution. A computer readable medium may take many forms, including but not limited to, non-volatile media, volatile media, and transmission media. Non-volatile media includes, for example, optical, magnetic disks, and magneto-optical disks, such as the hard disk 1807 or the removable media drive 1808. Volatile media includes dynamic memory, such as the main memory 1804. Transmission media includes coaxial cables, copper wire and fiber optics, including the wires that make up the bus 1802. Transmission media also may also take the form of acoustic or light waves, such as those generated during radio wave and infrared data communications.

Various forms of computer readable media may be involved in carrying out one or more sequences of one or more instructions to processor 1803 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1801 may receive the data on the telephone line and use an infrared transmitter to convert the data to an infrared signal. An infrared detector coupled to the bus 1802 can receive the data carried in the infrared signal and place the data on the bus 1802. The bus 1802 carries the data to the main memory 1804, from which the processor 1803 retrieves and executes the instructions. The instructions received by the main memory 1804 may optionally be stored on storage device 1807 or 1808 either before or after execution by processor 1803.

The computer system 1801 also includes a communication interface 1813 coupled to the bus 1802. The communication interface 1813 provides a two-way data communication coupling to a network link 1814 that is connected to, for example, a local area network (LAN) 1815, or to another communications network 1816 such as the Internet. For example, the communication interface 1813 may be a network interface card to attach to any packet switched LAN. As another example, the communication interface 1813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1813 sends and receives electrical, electromagnetic or optical signals that carry digital data streams representing various types of information.

The network link 1814 typically provides data communication through one or more networks to other data devices. For example, the network link 1814 may provide a connection to another computer through a local network 1815 (e.g., a LAN) or through equipment operated by a service provider, which provides communication services through a communications network 1816. The local network 1814 and the communications network 1816 use, for example, electrical, electromagnetic, or optical signals that carry digital data streams, and the associated physical layer (e.g., CAT 5 cable, coaxial cable, optical fiber, etc). The signals through the various networks and the signals on the network link 1814 and through the communication interface 1813, which carry the digital data to and from the computer system 1801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1801 can transmit and receive data, including program code, through the network(s) 1815 and 1816, the network link 1814 and the communication interface 1813. Moreover, the network link 1814 may provide a connection through a LAN 1815 to a mobile device 1817 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer-implemented method for preventing unsecured access to a computer over a network by a client running on a remote computer comprising:
   storing at least one client policy, said client policy including a configuration of said remote computer that reduces the likelihood of a security breach of said computer as a result of said remote computer accessing said computer;
   receiving a request from a user for access to said computer;
   determining a location type of said remote computer;
   selecting a desired policy from among said at least one client policy based on said location type of said remote computer;
   selecting a connection type from available connections to said computer based on said desired policy;
   verifying that said remote computer conforms with said desired policy; and
   connecting said client to said computer.

2. The method recited in claim 1, wherein said determining step includes determining said location type of one of: non-corporate/non-roaming, corporate/non-roaming, and non-corporate/roaming.

3. The method recited in claim 1, wherein said verifying step includes verifying that none of a list of forbidden applications are running on said remote computer.

4. The method recited in claim 1, wherein said verifying step includes verifying that none of a list of forbidden applications are running on said remote computer, said list of forbidden applications including at least one of: viruses, spyware, instant messaging, unlicensed, and file sharing applications.

5. The method recited in claim 1, wherein said verifying step includes verifying that all of a list of required applications are running on said remote computer.

6. The method recited in claim 1, wherein said verifying step includes verifying that all of a list of required applications are running on said remote computer, said list of required applications including at least one of: firewall, anti-virus, and anti-spyware applications.

7. The method recited in claim 1, further comprising: periodically determining that said remote computer conforms with said client policy; and
   taking a policy based action, said policy based action including at least one of: correcting a non-conforming condition and notifying said user of said non-conforming condition.

8. The method recited in claim 7, further comprising: disconnecting said client from at least one of said computer and an Internet connection if said non-conforming condition cannot be corrected.

9. The method recited in claim 1, further comprising: transmitting a list of policy violations to an access control gateway.

10. A computer program product including a computer storage medium, said computer storage medium comprising one of volatile media and non-volatile media, and a computer program code mechanism embedded in the computer storage medium for preventing unsecured access to a computer over a network by a client running on a remote computer, the computer code mechanism comprising:

a computer code device configured to store at least one client policy, said client policy including a configuration of said remote computer that reduces the likelihood of a security breach of said computer as a result of said remote computer accessing said computer;

a computer code device configured to receive a request from a user for access to said computer;

a computer code device configured to determine a location type of said remote computer;

a computer code device configured to select a desired policy from among said at least one client policy based on said location type of said remote computer;

a computer code device configured to select a connection type from available connections to said computer based on said desired policy;

a computer code device configured to verify that said remote computer conforms with said desired policy; and a computer code device configured to connect said client to said computer;

wherein said remote computer accesses said computer over said network if said remote computer conforms with said desired policy.

11. An apparatus for preventing unsecured access to a computer over a network by a client running on a remote computer comprising:

means for storing at least one client policy, said client policy including a configuration of said remote computer that reduces the likelihood of a security breach of said computer as a result of said remote computer accessing said computer;

means for receiving a request from a user for access to said computer; means for determining a location type of said remote computer;

means for selecting a desired policy from among said at least one client policy based on said location type of said remote computer;

means for selecting a connection type from available connections to said computer based on said desired policy;

means for verifying that said remote computer conforms with said desired policy; and means for connecting said client to said computer.

12. An apparatus for preventing unsecured access to a computer over a network by a client running on a remote computer comprising:

a storage mechanism configured to store at least one client policy, said client policy including a configuration of said remote computer that reduces the likelihood of a security breach of said computer as a result of said remote computer accessing said computer;

an input/output device configured to receive a request from a user for access to said computer; and a processor including:

a location determination mechanism configured to determine a location type of said remote computer;

a policy selection mechanism configured to select a desired policy from among said at least one client policy based on said location type of said remote computer;

a connection selection mechanism configured to select a connection type from available connections to said computer based on said desired policy; and a verification mechanism configured to verify that said remote computer conforms with said desired policy, wherein said input/output device is configured to connect said client to said computer.

13. The apparatus recited in claim 12, wherein said verification mechanism is configured to verify that none of a list of forbidden applications are running on said remote computer.

14. The apparatus recited in claim 13, wherein said list of forbidden applications includes at least one of: viruses, spyware, instant messaging, unlicensed, and file sharing applications.

15. The apparatus recited in claim 12, wherein said verification mechanism is configured to verify that all of a list of required applications are running on said remote computer.

16. The apparatus recited in claim 15, wherein said list of required applications includes at least one of: firewall, anti-virus, and anti-spyware applications.

* * * * *